US008131386B2

(12) United States Patent
Elberbaum

(10) Patent No.: US 8,131,386 B2
(45) Date of Patent: Mar. 6, 2012

(54) METHOD AND APPARATUS FOR SIMPLIFIED INTERCONNECTION AND CONTROL OF AUDIO COMPONENTS OF AN HOME AUTOMATION SYSTEM

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 439 days.

(21) Appl. No.: 12/484,321

(22) Filed: Jun. 15, 2009

(65) Prior Publication Data

US 2010/0316237 A1 Dec. 16, 2010

(51) Int. Cl.
G05B 19/18 (2006.01)
H04B 3/00 (2006.01)
(52) U.S. Cl. ............... 700/58; 381/77; 381/22; 381/23
(58) Field of Classification Search .......... 381/58, 381/77, 22, 23, 123, 80, 81; 700/1, 56–58, 700/94
See application file for complete search history.

(56) References Cited

U.S. PATENT DOCUMENTS

| | | | |
|---|---|---|---|
| 5,923,363 A | | 7/1999 | Elberbaum |
| 6,038,425 A | * | 3/2000 | Jeffrey ............................. 725/80 |
| 6,389,139 B1 | * | 5/2002 | Curtis et al. ................. 381/105 |
| 6,603,842 B2 | | 8/2003 | Elberbaum |
| 6,940,957 B2 | | 9/2005 | Elberbaum |
| 7,290,702 B2 | | 11/2007 | Elberbaum |
| 7,461,012 B2 | | 12/2008 | Elberbaum |
| 2002/0026552 A1 | * | 2/2002 | Shah et al. .................... 710/317 |
| 2003/0144848 A1 | | 7/2003 | Roy et al. |
| 2005/0131558 A1 | | 6/2005 | Braithwaite et al. |
| 2007/0223722 A1 | * | 9/2007 | Merrey et al. .................... 381/77 |
| 2008/0068207 A1 | | 3/2008 | Elberbaum |
| 2008/0188965 A1 | * | 8/2008 | Bruey ............................. 700/94 |
| 2009/0103228 A1 | | 4/2009 | Elderbaum |
| 2009/0106122 A1 | | 4/2009 | Elberbaum |
| 2009/0121842 A1 | | 5/2009 | Elberbaum |
| 2009/0141117 A1 | | 6/2009 | Elberbaum |

(Continued)

FOREIGN PATENT DOCUMENTS

JP 2000275318 10/2000

(Continued)

OTHER PUBLICATIONS

U.S. Appl. No. 12/236,656, filed Sep. 28, 2008. Specification and Drawings Attached.
Supplementary European Search Report dated Aug. 25, 2011, from the corresponding European Patent Application 10789888.4.

(Continued)

Primary Examiner — Xu Mei
(74) Attorney, Agent, or Firm — Katten Muchin Rosenman LLP

(57) ABSTRACT

A method and apparatus for distributing stereo signal of an audio system integrated with an home automation system. The audio system is further integrated with intercom and video intercom including the controlling of the intercom communications and the home automation appliances via a network and the Internet. The stereo signals are encoded and distributed from a selector/encoder, via distributors or directly to speakers via at least one single twisted pair carrying the encoded signals multiplexed with serial signals and with microphone signals for communicating with the intercom or with e-station via the network or the Internet. The multiplexed signals are propagated via the same twisted pair that also feeds a constant current to the system devices or providing power via separated twisted pair. The speakers include wired or wireless remote control receivers and transmitters for propagating remote control signals. The system is flexible and can be connected in many configurations using fitted network cables and connectors.

20 Claims, 15 Drawing Sheets

U.S. PATENT DOCUMENTS

2009/0214051 A1* 8/2009 Lockett et al. .................. 381/77

FOREIGN PATENT DOCUMENTS

| WO | 9513681 | 5/1995 |
| WO | 9963698 | 12/1999 |

OTHER PUBLICATIONS

International Search Report and the Written Opinion of the International Searching Authority, dated Nov. 4, 2010, from the corresponding PCT/US2010/027607.

* cited by examiner

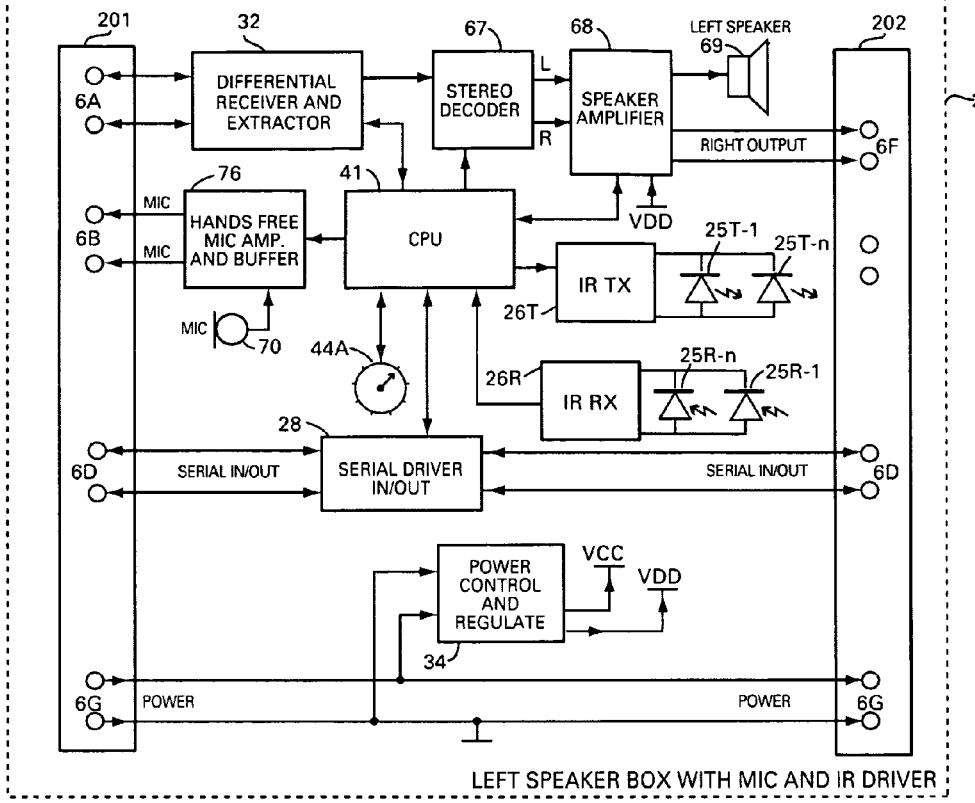
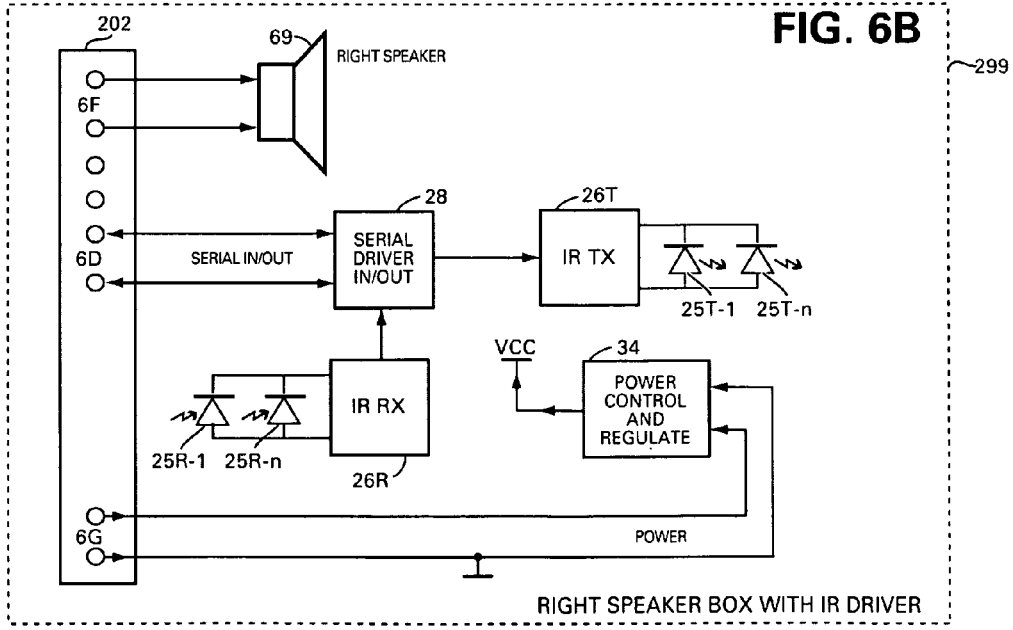

METHOD AND APPARATUS FOR SIMPLIFIED INTERCONNECTION AND CONTROL OF AUDIO COMPONENTS OF AN HOME AUTOMATION SYSTEM

BACKGROUND OF THE INVENTION

1. Field of the Invention

This invention is related to music players, audio amplifiers and speakers used in home automation and to intercoms or video interphone systems.

2. Description of the Prior Art

Audio and stereo amplifiers and pre amplifiers that are used in connection with home automations, home theater and similar applications, are in fact a common, well known audio appliances that are used and operated by consumers. The differences are in their structures, such as being constructed into a rack mounting enclosure and are provided with additional control line or bus line connectors for operating the audio appliances from a centralized panel.

Such audio systems are interconnected by different wires and shielded audio cables between the system rack, the speakers and a range of audio players. This requires long stretched audio cables, all the way from the user operated players such as CD, DVD, Blue-ray and/or ipod cradle that are located or placed in the living or dining room etc, at the user option, for convenient handling of audio or video disks. All the stereo signals including a television audio output signal require audio shielded cables that are fitted with plugs at the cable ends. No conduits are provided for such audio cables by the building architects during the design of the residence and during the construction.

Many such audio cables and heavy gauge speaker cables and control wires must be laid for connecting the audio system when the building is completed and the plurality of cables and wired must be stretched along built walls that spoil the interiors. Moreover, such connections are costly and must be handled by specialists.

Further, such audio systems do not provide connections and control for integrating the audio system with the intercom or video interphone, having two way communications with the entry panels, nor the remotely opening of the buildings or the house's doors, nor for communicating with the guard, a virtual doorman, a concierge and a virtual e-concierge connected to the video intercom or the intercom system of the building or the house.

Such intercom or video intercom systems are commonly installed along with the electrical system and are connected via twisted pair or pairs, such as a pair or pairs of the CAT 5 cables used for networking or telephones in a building. Such cables cannot be used to connect stereo audio signal into the input connectors of an audio pre amplifier or the amplifier. On the other hand, such CAT 5 cables are commonly designed for and are installed into conduit in building and houses, by the electrical contractor at far lower costs than the costs of wiring shielded audio cables.

In large cities such as N.Y the Fire department is intending to integrate the intercom system of apartment buildings with the fire alarms and to provide for transmitting voice messages or commands to a selected or all the apartments in the event of fire. Such interfacing and integration with intercoms is not readily available with many of the current intercoms and video intercoms system, some of which propagate digital audio signals that cannot be directly connected to audio amplifiers or pre amplifiers.

Further, audio systems for home automation do not incorporate microphones for processing the well known "hands free" audio signals, such as used by hands free telephones, while such two way hands free communications are very useful for bed ridden, the elderly and the sick to call for emergency and communicate with medical doctors, a service that is more and more needed due to the aging of the population.

SUMMARY OF THE INVENTION

An object of the present invention is to provide a method and apparatus for interconnecting the audio system components with the home automation system and/or the intercom or the video intercom via simple wiring method, such as using twisted pair wires, similar to the communication wires used for networking or telephones.

The term intercom in the following descriptions comprise an intercom, and/or a video intercom, and/or an interphone, and/or video interphone, and/or a shopping terminal and combinations thereof, operated in a stand alone setup or in a system and/or as a part of a larger system having two way audio communications between a tenant with one or more entry panels of a building and/or between a tenant with one or more local stations, such a concierge station, a guard station and an administration station of a building and/or between a tenant and e-stations, such as fire station, alarm monitoring station, medical station, e-concierge station, e-service station, e-doorman or virtual doorman station and e-shopping station via a network and/or between the local stations and the e-stations.

A tenant in the following descriptions can be a person in his residence and/or in a commercial facility, and/or in a warehouse, and/or in a factory and/or in other building, and/or in houses and combinations thereof.

In the following descriptions a Building refers to a single house and/or to multi apartment building, and/or to a warehouse, and/or to a commercial building, and/or to a factory building, and/or to other structured building and combinations thereof. An apartment refers to a unit within a building, such as a residence unit, or office unit, or factory unit, or a shop and other units of buildings.

The terms Left speaker and Right speaker in the following descriptions are used for convenience only, in line with the orientation of the illustrated speakers in the drawings. Whenever a left speaker or right speaker is disclosed and/or its structure is detailed, the Left-Right orientations of the drawings, in the specifications and the claims are illustrative only, with the Left-Right terms are reversible, as the case may be, wherein left can be read as right and right can be read as left.

Video interphone systems are disclosed in U.S. Pat. Nos. 5,923,363; 6,603,842 and 6,940,957. Shopping terminals are disclosed in U.S. Pat. No. 7,461,012 and a continuation application Ser. No. 12/275,452.

A method and apparatus for controlling and/or operating appliances of an home automation system are disclosed in U.S. Pat. No. 7,290,702, published application Ser. No. 11/509,315 and patent application Ser. Nos. 11/874,309; 11/939,785; 11/949,853 and 12/236,656.

The audio system of the present invention includes a selector/encoder unit for placement in the living or dining room or in other locations as selected by a tenant, along with or close to the playback device or devices. The term "music source or sources" in the following descriptions refers to one or more playback devices, such as CD, DVD, Blue-ray, ipod, ipod cradle, MP3, including a radio, television, set-top box, cable box, satellite box and other appliances having output stereo connectors for outputting audio signals, analog or digital, via standard cable assemblies with plugs, for connecting to the input connectors of the selector/encoder unit.

The selector/encoder unit includes a remote control IR and/or wireless receiver for receiving select commands and for connecting any of the selector inputs to the encoder circuit, for outputting and propagating an encoded stereo signal to an audio distributor for distributing the signals to speaker pairs mounted on walls and/or ceilings and/or for connecting free standing speakers that are placed in the apartment as desired by the tenant.

The audio distributor may include a decoder for decoding the stereo signals and an amplifier or amplifiers for outputting decoded and amplified stereo signals to the stereo speakers in one or more rooms of the building or the apartment.

The present invention feeds the encoded stereo signals multiplexed with control signals via a single twist pair to one set of left-right speakers, each includes a decoder and a power amplifier, or to one speaker only, for example the left speaker, having a decoder, a stereo amplifier and terminals for connecting the right speaker of the example, via a separate twist pair. Such arrangement enables to connect the right-left speakers in a cascaded extension, when at least one of the speakers includes decoder/amplifier. A twist pair is a reference also to one pair of wires of a CAT 5 cable that is commonly used in buildings for network or telephone connections.

Similarly, the encoded stereo signals can be propagated to the audio distributor by a single twisted pair connecting the selector/encoder to the audio distributor, thereby providing for propagating the selected audio signals from the encoder via a twisted pair all the way to the each pair of left-right speakers in the apartment.

The selector/encoder is also operated by serial command signals and can communicate with the home automation distributor and with the video interphone monitor or the intercom controller. The video interphone monitor, the shopping terminal and the home automation distributor are disclosed in the above reference patents and patent applications that are incorporated herein by reference.

The serial command signals, such as the well known RS422 or RS485 or any other serial signals that are propagated between the intercom system, the electrical operated appliances, the controllers of the electrical appliances, keypads and the remote control devices and drivers are exchanged through the home automation distributor and by connecting the control circuit of the audio distributor and the selector/encoder to the serial command circuit of the home automation, it become clear that the audio system of the present invention can be integrated to operate and be controlled through the home automation and/or the intercom system.

Another objective of the present invention is to incorporate two way audio communications between the apartment and the entry panels of the building and/or between the apartment and a local station such as local guard and/or with e-station such as alarm, emergency and medical monitoring stations.

For this purpose the present invention provides for propagating a monaural audio from at least one room or zone of the apartment, in which at least one of the left-right speakers includes a microphone. For example, the left speaker comprising a decoder and an amplifier further includes a microphone and a circuit for multiplexing the microphone signal into the encoded stereo signal line and propagating the multiplexed microphone signal to the audio distributor or to the selector/encoder unit, in reverse direction to the propagation of the encoded stereo signal. Both the audio distributor and the selector/encoder include a circuit for extracting and feeding the extracted microphone signal to the intercom system.

The serial command signals according to the present invention are also processed and are multiplexed into the stereo encoded line for propagating two way multiplexed signals including the commands between the speakers, the microphone circuits, the audio distributor, the selector/encoder unit, the home automation distributor and the intercom system.

Even though the present invention provides for propagating the multiplexed two way serial commands via the encoded signal line to the selector/encoder unit, in practice and as explained in the description of the preferred embodiment, the serial commands between the selector/encoder unit and the audio distributor are propagated separately via a twisted pair of a standard network cable, such as CAT 5 cable. CAT 5 cable is commonly available fitted with well known RJ45 connectors having 8 pins for connecting four twisted pair wires into a network switch or a PC, or RJ11 with 4 pins for connecting two pair of wires into telephones. Wall sockets with RJ45 or RJ11 connectors (8 pins or 4 pins) are commonly available and because the selector/encoder of the present invention is intended to be placed by the user in a convenient location, it will be simple to use a standard network cable fitted with plugs at both ends for connecting the selector/encoder to a standard RJ45 wall socket, that is hooked up at its other end of the cable with the audio distributor.

As explained above the internal connections of the audio system components including the connections with the home automation system are made via twisted pairs throughout and as explained further below, the same twisted pairs are used to connect the audio system to the intercom system. Further, since CAT 5 cables and the twisted pairs are commonly installed along with and during the electrical installation of a building by the electrical installers, it becomes clear that the audio system of the present invention can be conveniently installed by electricians at far lower costs.

The commonly employed intercom systems generate analog audio signals that are propagated via low impedance lines and circuits to the handset or to the hand's free mic and speaker system, for communicating with the entry panel or panels of the building or with the local station, such as a guardman station. The use of low impedance (lines and circuits) is because low impedance based signals are less sensitive to electrical noises and to the AC electrical current noises, including the known 50 Hz or 60 Hz "hum". The low impedances of the commonly installed intercoms and their circuits can therefore be connected via twisted pairs such as the twisted pairs of the CAT 5 cables.

This enables to connect the intercom system with the audio distributor via two twisted pairs, one pair for carrying the speaker signal of the intercom system through the audio distributor to the audio system speakers and the other pair for carrying the microphone signal, reprocessed by the audio distributor, in reversed direction—to the intercom system, thereby completing the interconnection for the two way audio communication between the intercom system and the audio system of the home automation. The serial command signals can be fed from the intercom controller or from the video interphone of the preferred embodiment controller to the audio distributor via a single twisted pair connected to both, the home automation distributor and the audio distributor.

As disclosed in the above referenced video interphones, shopping terminal and home automation patents and applications which are incorporated herein by reference, the video interphone monitor is feeding via a twisted pair a combination, multiplexed signals selected from audio, video, control, data, code and alarm signals to a serial converter such as USB converter associated with the home automation distributor, for communicating with the tenant's PC. By this arrangement the video interphone is connected to both, the home automation system and the audio system by a total of four twisted pairs of a standard CAT 5 cables, two pairs for connecting the microphone and speaker signals, one pair for the serial command signal and one pair for the combination, multiplexed signals.

Even though the interconnections between the video interphone or video intercom with the home automation and the audio system of the present invention via few twisted pair wires is simple, and even though the interconnections are non polar and can be reversed, the need to interconnect two distributors and follow the wires of the CAT 5 cables color code within the system can be improved. It may be preferable therefore to use a well known standard connectors such as RJ45 throughout the system. For this the present invention provides a combined audio with home automation distributor, including speakers, that are all connected via standard cables such as CAT 5 and standard connectors, such as RJ45.

As further disclosed in the published patent application Ser. No. 11/509,315 incorporated herein by reference, the remote control commands generated by each of the IR or wireless remote controls of the audio playback devices, such as the CD or DVD player, the ipod, including the remote control devices of a radio and/or the TV, are recorded into the memory of the video interphone or the shopping terminal and are used as the command source for the remote controlling of the audio playback devices through an IR and/or wireless repeaters or drivers that are installed in the different rooms or zones of the apartment.

The selector/encoder is further providing an individual wired remote control for each audio playback device via an individual serial command connector. This ability to control each of the audio playback device, the radio and/or the TV that are connected to the selector/encoder 100 is another advantage, enhancing the simplicity of the interconnections, the setting up, the controlling and the operation of the integrated audio and home automation system of the present invention.

Further, the speakers of the present invention include one or more IR receiver and processing circuit for injecting the received IR commands into the stereo encoded line, for propagating the IR commands to either the home automation distributor, or to the audio distributor or to both, by this the preferred embodiment speakers of the present invention provide additional receiving relay stations for the IR commands and thus creating an improved IR commands receiving environment for the home automation system. Similarly, the speakers of the present invention include one or more IR transmitters providing added distribution and improved propagation of the IR commands of the home automation system.

Moreover, the expansion of the home automation IR remote control network via the IR receivers and/or the IR transmitters of the speakers enables to propagate the IR remote control command to the selector/encoder of the present invention, even if it is not wired to the home automation serial command line. This is because the selector/encoder receives the commands via the IR drivers of the home automation system. The propagations of the IR commands are further explained in the preferred embodiment description.

As the speakers boxes of the present invention may include control circuit, microphone circuit, decoder circuit and audio power amplifier, the circuits in the speaker boxes must be powered accordingly.

As disclosed in the above video interphone U.S. Pat. No. 5,923,363 and the referenced patents and applications, the power can be fed via the multiplexed signal line with a fixed and constant controlled current, with a portion of the current drain is allocated to charge a rechargeable battery associated with the video interphone or the shopping terminal. The referenced patents also disclose the powering of the video interphone and the shopping terminal via a separate power line.

Similar powering methods are incorporated in the present invention, one is to apply a controlled limited current for operating the speakers with lower audio power output. The second is to apply a controlled current for operating the lower audio power output, plus a charge current for charging a rechargeable batteries associated with the speaker boxes, for using the charged batteries to enable a higher peak power audio output. The third is to connect DC power directly to the speaker box, for example to power the speaker boxes via a DC power line in combination with the power fed to the audio distributor and to the selector/encoder, using an external power supply that is also used to power the home automation control system.

The method and apparatus for connecting the speakers of the present invention by a single twisted pair including the powering of one pair of two speakers, Left and Right, features error free simplified interconnection, such as providing for non polar connections in which the two wires can be connected with reverse polarities. The error free reversed polarity covers the power feed via separate twisted pair line and the encoded stereo lines and/or the multiplexed signal lines, with or without power feed. The detailed simplified connections of the power lines for powering the audio system are further explained in the details of the preferred embodiment descriptions.

The propagated stereo signal source such as DVD, ipod or radio is selected through a well known analog or digital selector and is fed from the selector to a well known stereo encoder that is available in different IC packages but can be assembled into well known stereo encoder circuit using discrete components. The stereo encoder is fed with a clock such as 38 KHz or higher frequency for generating and outputting an encoded stereo signals with 19 KHz pilot signal, which is the same pilot signal used for the transmission of stereo signal by FM radio stations. The encoded stereo L-R signals are fed to a well known differential driver amplifier for feeding the encoded stereo signal via a twisted pair to a speaker incorporating stereo decoder and amplifier directly or via the audio distributor.

For propagating digital and/or compressed audio signals, the combined left-right signals are programmed and timed to provide zero time delays between the left and right channels. For digital signal propagation there are many well known digitizing, coding and compression circuits and programs, any of which can replace the stereo encoder and mixer that are used for the analog stereo signals propagation. Moreover, as explained further below, with digital signals propagation it is possible to combine the control signal through the same DSP (digital signal processor), CPU or other digital devices that are widely available in an IC packages, to reduce the total components need and the costs.

The referenced patent applications of the home automation disclose a simple addressing method and apparatuses for setting the addresses by the installer of the system, i.e., the electrician and/or even the user himself. Similarly, the address for each pair of speaker must correspond to the assigned room or zone where the speakers are installed. This is the same addressing as applied for lights, airconditioners and the different audio and video appliances, all set via at least one rotary switch, as disclosed in the referenced home automation patent applications.

The present invention provide for n rotary or DIP switches incorporated in the audio distributor, for setting an address to each encoded stereo output line, or for each amplified stereo output line and to each speaker incorporating the encoder. The rotary or DIP switches are accessible through the panel of the audio distributor and the speaker cover and can be set from number 1 to n (room address), using common screwdriver. This eliminates the need to code the addresses by using a complex programming and processes, which are prone to errors, particularly when the installer is not an IT specialist or the user is not familiar with the programming altogether.

The audio distributor includes n number of well known differential buffer amplifiers to feed n speakers in the apartment. When the speaker circuits are fed with power via the same twisted pair carrying the combined modulated stereo signal the differential buffer amplifiers include, or are connected to, DC feed circuits such as DC and signal inserter or injector/separator or separator which are disclosed in the U.S. Pat. No. 5,923,363. The power line inside the speakers leading to the power regulator include a bridge rectifier to enable non polar DC power connection, regardless if the power is fed to the speaker circuits through the encoded or multiplexed signal line, or via a separate twisted pair that carries DC power only.

The present invention further provides for incorporating an IR remote control circuit inside the speakers for feeding remote control commands directly to the speakers for operating the volume, the tone control and balance control and/or for switching the sound on and off. The received IR commands can be propagated via the encoded signal lines back to the audio distributor and/or to the selector/encoder unit when the volume, tone, balance and on-off commands are controlled by the selector/encoder unit. Furthermore the IR remote control can be used to activate the hands free circuit for requesting medical or emergency help, or in response to a call by a visitor through the intercom panel, or by the guardman and/or by an alarm messages, it can close the hands free circuit, thereby switch off the intercom communications and/or open an electric door lock to enable a visitor to enter the building.

The two way hands free communication of the present invention offer yet other substantial advantages. For example, when the communication with the intercom system is activated, automatically via the alarm system or via a visitor or a concierge call, the left channel speaker is automatically muted for eliminating acoustic feed back to the microphone, that is included in the example of the left speaker. The monaural incoming speaker sound is fed, in the example, to the right speaker that is commonly mounted at a distance from the left speaker, thereby providing a far better acoustic condition for the hands free two way communications.

This too is further improved by operating a remote control key to mute also the right side speaker while the tenant is talking to the microphone, thereby providing undisturbed two way hands free communications at the user control.

BRIEF DESCRIPTION OF THE DRAWINGS

The foregoing and other objects and feature of the present invention will become apparent from the following description of the preferred embodiments of the invention with reference to the accompanying drawings, in which:

FIG. 6A is another block diagram of a left side speaker including standard connectors for interconnecting the left-right speakers;

FIG. 6B is a block diagram of the right side speaker including IR receivers and IR transmitters and a standard connector for interconnecting the right speaker with the left speaker shown in FIG. 6A;

DETAILED DESCRIPTION OF THE PREFERRED EMBODIMENT

Figure 1A:
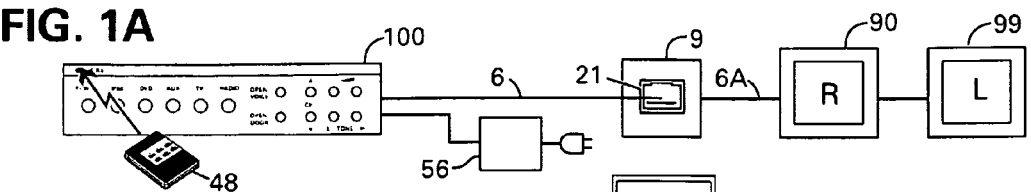
FIG. 1A is a block diagram of a basic setup and interconnections for propagating the encoded stereo signals of the home automation system of the present invention.

FIG. 1A shows a basic interconnection and a setup of an audio system of the present invention, wherein playback audio devices (not shown) such as ipod, MP3, DVD, CD and/or blue-ray players and/or a radio and/or a TV set are connected to the input connectors of a selector/encoder 100. The selector/encoder 100 is further connected to a power supply 56 for powering the selector/encoder 100 and for feeding power via the cable 6 and a twisted pair 6A to the Left speaker assembly 90. As will be explained later the selector/encoder 100 encodes a selected stereo signal fed from any of the playback audio devices, the radio or the TV for feeding an encoded stereo signal via a single twisted pair to the speaker assembly 90.

The cable assembly 6 is a well known standard network cable, such as CAT 5 cable, comprising four twisted pair wires, that is commonly available in reels or otherwise in different length, fitted with RJ45 connectors 21 at the cable ends, or non-fitted. The selector/encoder 100 includes a matching RJ45 socket, shown in FIG. 2, for connecting one end of a fitted cable assembly 6, such as a well known network cable that connects different PCs to a network hub or switch. The other end of the cable assembly 6 is plugged into a well known standard wall socket 9 incorporating a standard RJ45 socket 21.

The use of wall socket and a fitted cable 6 enables the placement of the selector/encoder 100 at the user's preferred location and/or adjacent and/or close to the playback audio devices, the radio or the TV. The socket 21 of the wall socket 9 is connected via a twisted pair 6A to the Left speaker assembly 90. The shown twisted pair 6A can be a single pair of a CAT 5 cable that is commonly installed by electrical installer and fed through a conduit, plenum, and/or inside walls during the construction of a building or along the walls when the building is completed.

The Left speaker assembly 90 shown in FIG. 1A is powered by a DC power fed through the cable 6 and the twisted pair 6A by the power supply 56 and through the selector/encoder 100. The details of the power feed are explained later. The left speaker assembly 90 includes a decoder for decoding the encoded stereo signal and a stereo power amplifier that feeds its left channel output signal directly to the left speaker of the speaker assembly 90. The Right speaker assembly 99 is connected to the right channel output signal of the stereo amplifier via a twisted pair such as twisted pair of a CAT 5 cable and via terminals provided in both speaker assemblies 90 and 99. By this the audio system shown in FIG. 1A is feeding stereo signals generated by an audio stereo playback device or other source of stereo signal to a pair of speakers, including all the power feed via a cascaded single twisted pair, connecting all the system elements in a cascaded chain, starting at the power supply 56 and terminating at the Right speaker assembly 99.

Even though the explanation does not refer to each cascaded interconnection as a segment, for simplifying the explanations and the claims, the term "first segment" cover the cascaded interconnection between the referenced selector/encoders and a left speaker or between the referenced selector/encoders and a referenced audio distributor.

The term "next segment" covers the cascaded interconnection between the referenced audio distributor and the left speaker.

The term "subsequent segment" covers the interconnection between the left speaker and the right speaker.

Figure 4A:
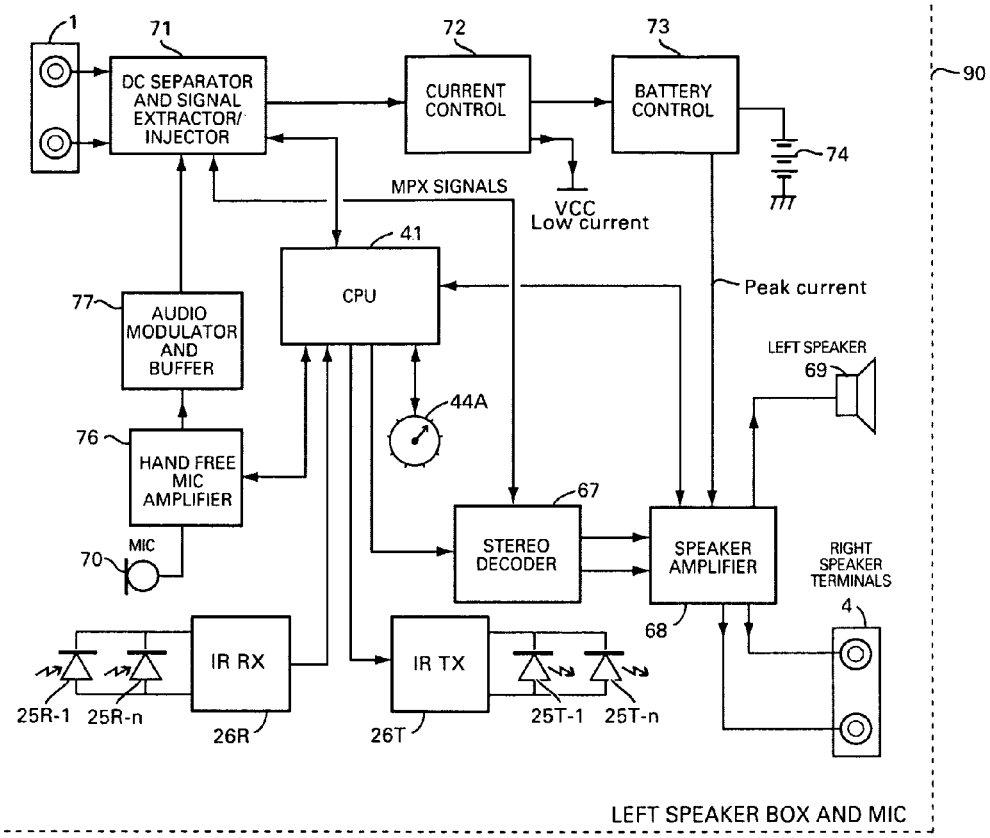
FIG. 4A is a block diagram of the left side speaker powered via the signal line, including a microphone, amplifier and a rechargeable battery circuits, for outputting peak high power sound of a preferred embodiment.
Figure 4B:
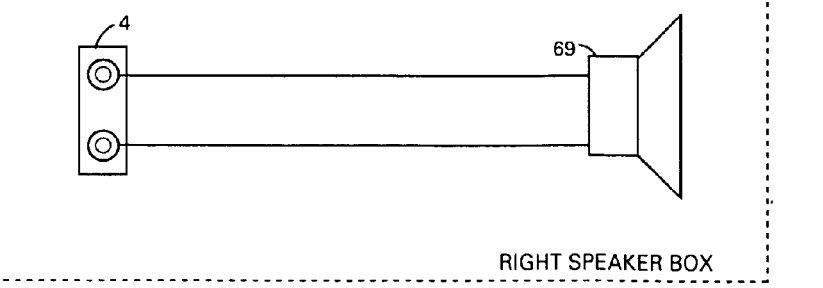
FIG. 4B is a block diagram of the right side speaker as used in the present invention.
Figure 14:
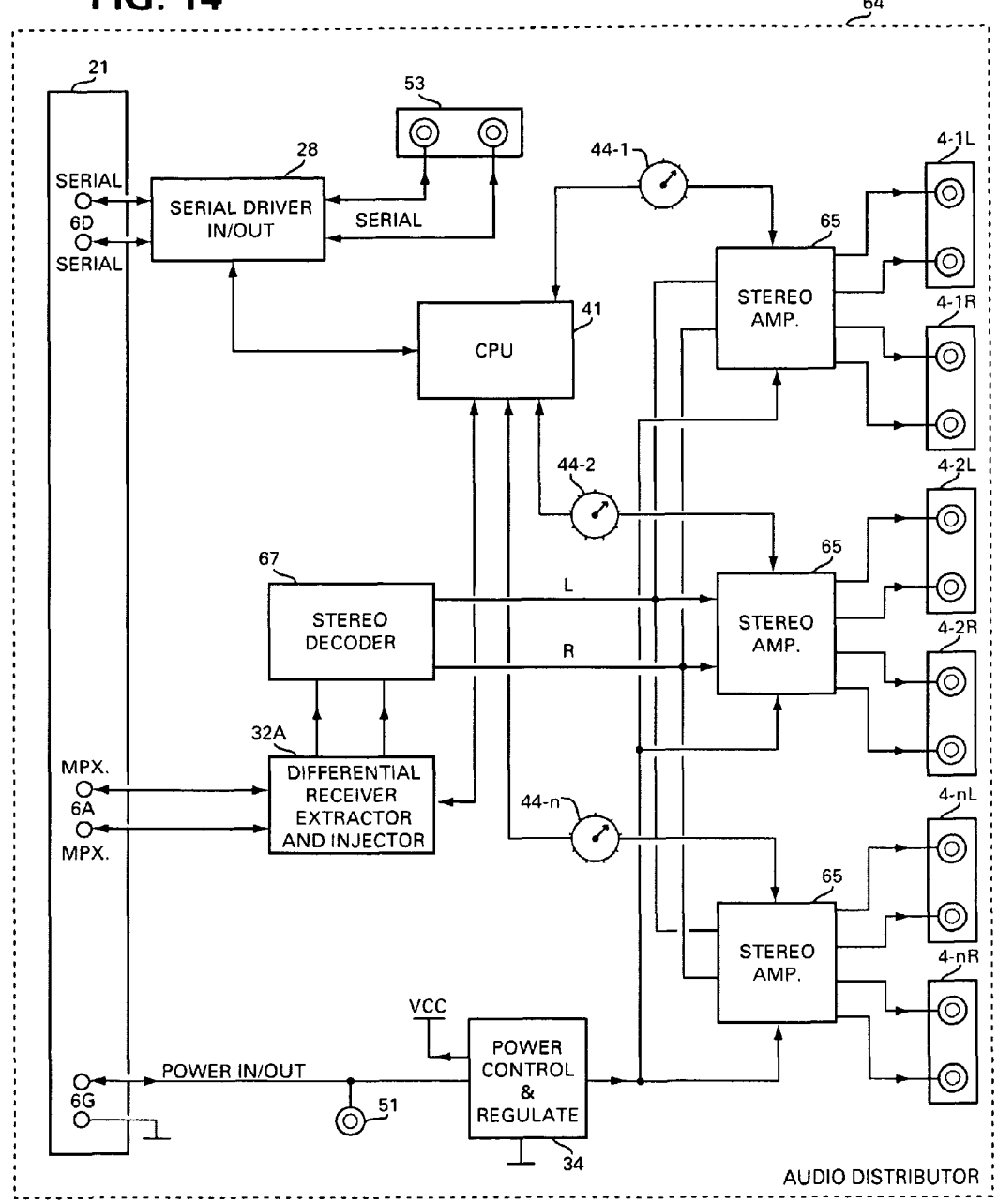
FIG. 14 is a block diagram of the audio distributor of the present invention, including power amplifiers for feeding individual amplified speaker signal to speakers such as shown in FIG. 4B.

The term "last segment" covers the interconnections between the distributor 64 of FIG. 14 with the speakers 99 of FIG. 4B.

The interconnections within a segment such as the interconnections to and from an intersecting one or more wall sockets of the first segment for example, are termed "sections".

Figure 2:
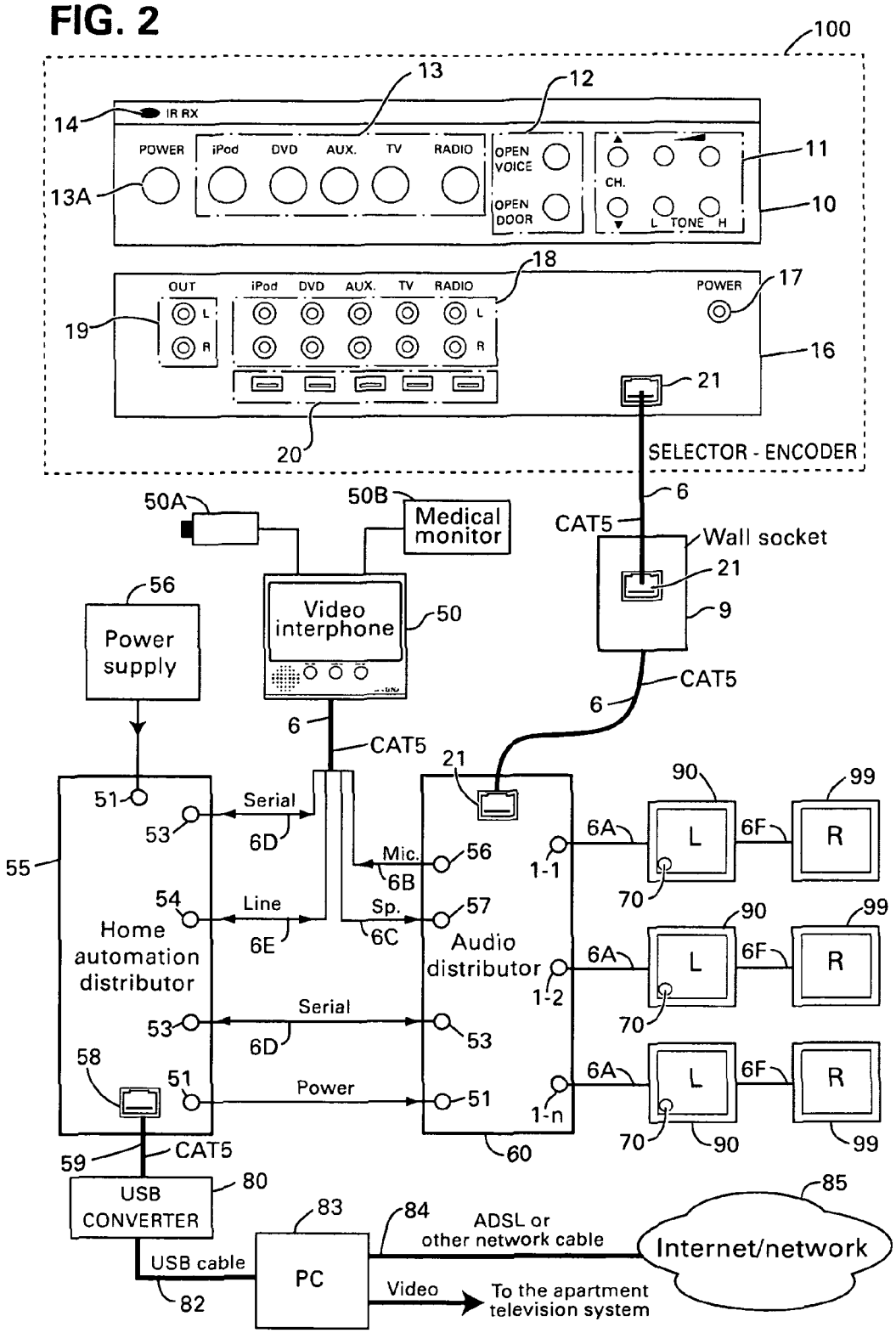
FIG. 2 is a detailed block diagram of the system interconnections shown in FIG. 1F, including particulars of the selector/encoder of the preferred embodiment.

The audio system is operated via the front panel keys 11, 12 and 13 shown in the front panel 10 of the selector/encoder 100 of FIG. 2 and/or via an IR remote control 48. Instead of IR a well known RF remote control or any other remote control 48 can be used. Even though the preferred embodiment description repeatedly touches upon IR remote control, any well known wired or wireless remote control, such as RF, ultrasound or others can be used. From the above explanation it becomes clear that the components or elements of the audio system of the present invention as shown in FIG. 1A are interconnected by a single twisted pair and that the audio system can be remotely operated via an IR or RF remote control device, and/or directly through the select and operate keys of the selector/encoder 100.

Figure 1B:
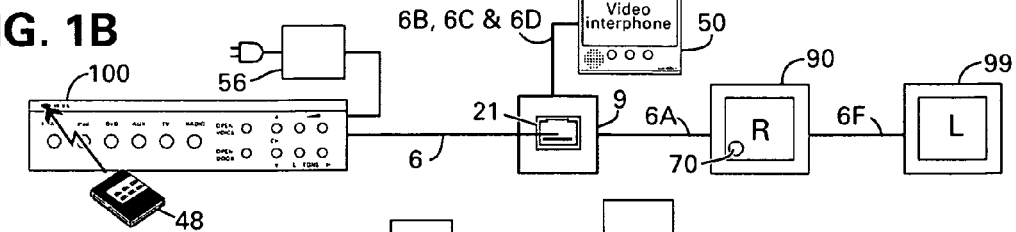
FIG. 1B is an expanded block diagram of FIG. 1A to include the interconnection with the video interphone or intercom system of the preferred embodiment.

FIG. 1B shows the same interconnections shown in FIG. 1A with an added signal lines 6C of an intercom speaker and 6B of a microphone included in the speaker 90 for integrating the audio system with the intercom circuit of the video interphone or intercom monitor 50. The Left speaker 90 of the audio system of FIG. 1B includes a microphone 70 and a circuit to multiplex the microphone signal into the encoded signal line for propagating the microphone signal to the selector/encoder 100 via the encoded signal line 6A. The selector/encoder 100 includes a decoder or extractor for extracting the microphone signal and for feeding the extracted microphone signal through a twisted pair 6B of the cable assembly 6 connecting the selector/encoder 100 to the wall socket 9. An extension twisted pair 6B, such as a pair of CAT 5 cable, connecting the video interphone or intercom, feeds the microphone signal from the wall socket 9 to a microphone terminal of the video interphone or intercom 50.

The speaker signal from the intercom circuit of the video intercom monitor 50 is fed via a twisted pair 6C to the wall socket 9 and via a separate twisted pair 6C of the cable assembly 6 to the selector/encoder 100. The serial command signals are exchanged between the selector/encoder 100 with the video interphone 50 through a twisted pair line 6D that is also interconnected via the wall socket 9. The interconnections of FIG. 1B show that the two way intercom communications and controls are integrated with the audio system including at least one of the speakers 90 or 99 and the microphone 70 and that the integrated intercom system can be operated by the keys of the selector/encoder 100, or by the remote control 48.

Figure 1C:
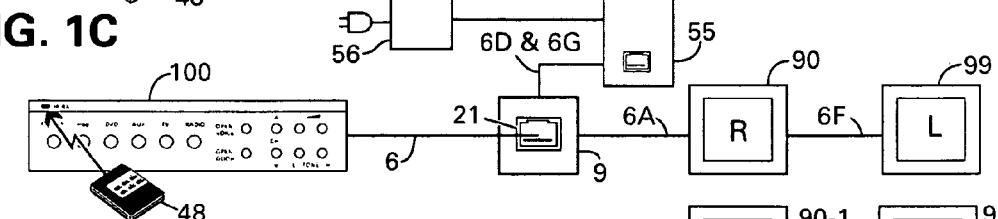
FIG. 1C is a block diagram of another expanded setup of the system shown in FIG. 1A, including the interconnection with the home automation distributor of the preferred embodiment.

FIG. 1C shows the audio system of FIG. 1A integrated with the home automation having similar interconnections to those shown in FIG. 1A without the microphone and speaker signals, but with the serial command signal line 6D for exchanging serial commands including control, codes and alarm signals between the home automation distributor 55, the speaker 90 and the selector/encoder 100 through the wall socket 9. The home automation distributor feeds the command, control and alarm signals to the selector/encoder 100 via the serial command line 6D through the wall socket 9 and to the speaker 90 via the stereo encoded line 6A. The line 6D connecting the wall socket 9 and feeding the serial commands to the selector/encoder 100 is a twisted pair of the standard CAT 5 network cable 6 fitted with the RJ45 connectors 21.

Even though the serial commands can be propagated to the selector/encoder 100 via the twisted pair 6A carrying the encoded stereo signal, it is simpler to propagate the serial command signal to the selector/encoder 100 via the separate twisted pair 6D. This is firstly because the home automation distributor 55 includes an extract serial commands circuit for extracting the serial signals from the multiplexed signals fed to it, and secondly because the standard network cable 6 consists of four twisted pairs and it is simpler and less costly to feed the extracted serial commands, via an available existing twisted pair 6D of the cable assembly 6.

The cable assembly 6 fitted with the standard RJ45 connectors 21, such as used with network hubs, switches, routers and PCs, or non-fitted is adopted to be the connecting cable for all the versions and variations of the audio system of the preferred embodiment of the present invention. Yet, even though the RJ45 connectors and CAT 5 cable are repeatedly disclosed here, any other standard or non standard connectors and/or terminals and/or cables can be used to replace the disclosed RJ45 connectors 21 and/or the CAT 5 cable and/or the cable assembly 6.

The exchanging of multiplexed combination of signals are disclosed in details in the referenced video interphone and shopping terminal patents and pending application and in the referenced patent application Ser. Nos. 11/939,785, 11/509, 315 and the other non published applications disclosed above, which are all incorporated herein by reference. By the shown interconnections of FIG. 1C it becomes clear that the audio system of the present invention can be integrated with the home automation system disclosed in the referenced patents and be operated via the home automation controls and moreover, keys of the selector/encoder 100 and/or the remote control 48 can be used to operate the home automation system.

The power for the speaker 70 and the selector/encoder 100 shown in FIG. 1C is fed by the power supply 56 that is also used to power the home automation control and propagation circuits and the audio system of FIG. 1C. The power can be fed two ways, via the encoded stereo line 6A or it can be fed to the speaker 92 of FIG. 5B via a separate twisted pair 6G of a CAT 5 cable, if such cable is used to connect the speakers with the wall socket 9. Similarly, when the selector/encoder 100 is not connected to the intercom speaker and microphone lines, the unused twisted pairs 6B or 6C can be used to carry the DC power to the selector/encoder 100, the twisted pair carrying power is referred to hereafter as 6G FIG. 1D shows an expanded setup of the audio system interconnections including the audio distributor 60 of the preferred embodiment of the present invention, in which n pairs of left-right speakers 90-1~90-n and 99-1~99-n can be installed and connected in the many rooms or zones of an apartment, with each of the speaker pairs can be controlled and switched on-off independently.

The audio distributor 60 is fed with the encoded stereo signal through the twisted pair 6A of the CAT5 cable 6, connecting the selector/encoder 100 with the audio distributor 60, via the wall socket 9 and via RJ45 connector 21 fitted at the end of the CAT 5 cable 6. The audio distributor 60 includes n number of differential line receivers and buffers 42 shown in FIGS. 12 and 13 for propagating buffered encoded stereo signal including a multiplexed two way serial command signals to and from the n speakers 90-1~90-n.

Figure 1D:
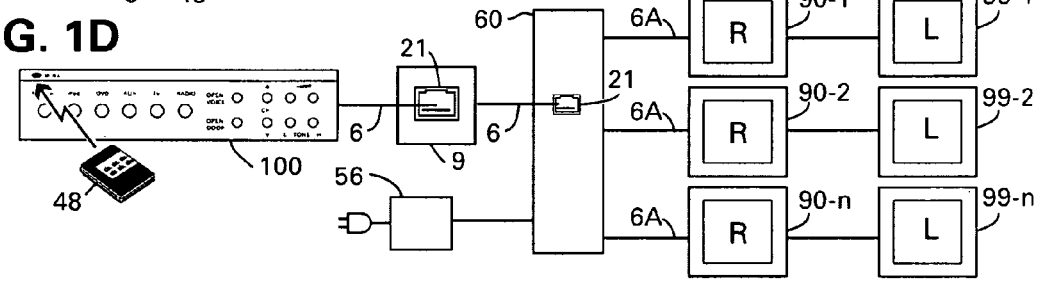
FIG. 1D is a block diagram of a system with multi speaker channels setup, the audio distributor and the interconnections for propagating encoded stereo signals of the present invention.

The DC power supply 56 shown in FIG. 1D powers the audio distributor 60, the speakers 90-1~90-n and the selector/encoder 100. For powering the speakers 90-1~90-n the DC power is fed by the audio distributor 60 via the DC injectors or inserters 35B shown in FIG. 12 through the buffered and multiplexed signal terminals 1-1~1-n, or it can be fed via a separate twisted pair 6G of the CAT 5 cable and via terminals 3-1~3-n of the audio distributor 63 shown in FIG. 13 to the n speakers 92 shown in FIG. 5B.

The distributor 60 of FIG. 1D propagates the multiplexed two way serial signals between the speakers 90-1~90-n and the selector/encoder 100 through the encoded line 6A, providing for the selector/encoder 100 to be the control center for the stand alone system shown in FIG. 1D, including the use of the remote control 48.

The power to the selector/encoder 100 can be fed from the audio distributor 60 via the encoded line 6A or via an otherwise unused twisted pair line 6G, or it can be fed by a separate power supply 56 directly to the power connector 17 shown in FIG. 2.

Each of the right side speakers 99-1~99-n is connected by a twisted pair 6F, such as a pair of a CAT 5 cable extending from the left side speakers 90-1~90-n via the terminals 4 shown in FIGS. 4A and 4B, thereby completing the interconnections of the expanded audio system shown in FIG. 1D using twisted pairs, cascading throughout the system interconnections.

The operations and controls of the system shown in FIG. 1D are same as described above for the system shown in FIG. 1A with the exception of the addressing of each pair of speakers 90 and 99, which will be explained later.

Figure 1E:
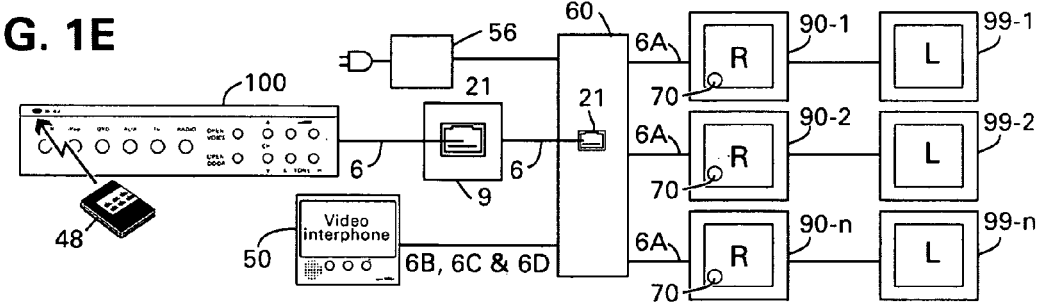
FIG. 1E is an expanded block diagram of FIG. 1D to include the interconnections with the video interphone or intercom system of the preferred embodiment.

FIG. 1E shows an expanded audio system interconnection similar to the system shown in FIG. 1D explained above, integrated with the intercom circuit of the video interphone or video intercom monitor 50. The intercom interconnections of FIG. 1E are similar to interconnection used for the system shown in FIG. 1B above and includes the intercom speaker signal that is fed via the twisted pair 6C to the distributor for propagating the signal to the speakers 90 and a microphone signal fed from the microphones 70 included in the n speakers 90. The microphone signal is multiplexed and propagated in reverse direction via the encoded line 6A from the speakers 90-1~90-n to the audio distributor 60. The audio distributor 60 includes a circuit to extract and feed a selected microphone signal to the intercom system via the twisted pair 6B, thereby completing the two way interconnections and propagation of signals between the intercom and a selected channel of the speakers 90 and 99 and a microphone 70 included in the speaker 90.

The serial command signals for operating and controlling the integrated audio and intercom system are multiplexed and propagated over the encoded signal line 6A between the speakers 90-1~90-n and the audio distributor 60 and via the serial command line 6D between the video intercom monitor 50 and the audio distributor 60. The serial command between the distributor 60 and the selector/encoder 100 can be propagated via the encoded and multiplexed line 6A or via the serial command line 6D and through the wall socket 9 as propagated in the system shown in FIG. 1C above. Because the video interphone or intercom 50 includes a serial command terminals for exchanging two way serial signals with the audio distributor 60 and the home automation distributor 55, the same twisted pair line 6D can be used also to exchange serial commands between the video interphone or intercom 50 and the selector/encoder 100, be it via the audio distributor 60, and/or via the home automation distributor.

By this it become clear that the expanded audio system of the present invention as shown in FIG. 1E can propagate the encoded stereo signals via cascading twisted pairs throughout the system, including the multiplexed microphone signals and the intercom speaker signals needed to integrate the audio system with the intercom system, and be operated by the keys of the selector/encoder 100, the remote control 48, and via the video interphone or intercom 50.

Figure 1F:
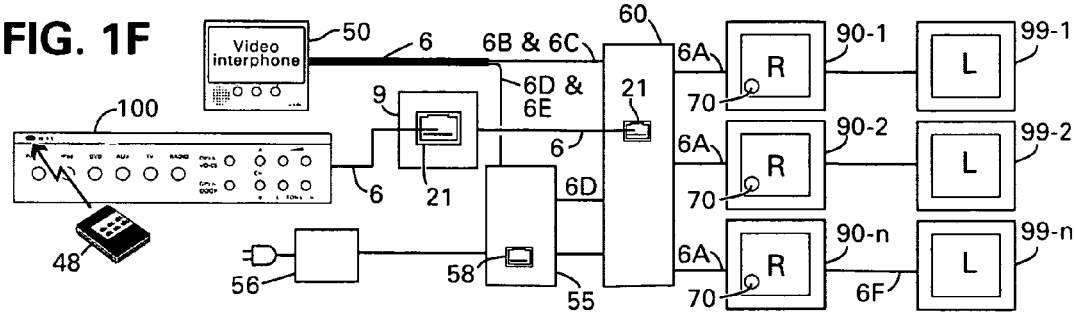
FIG. 1F is a further expanded block diagram of the preferred embodiment of FIG. 1E to include the interconnections with the home automation system.

FIG. 1F shows the integration of the expanded audio system shown in FIG. 1E with the home automation system via the home automation distributor 55. The differences between the interconnections shown in FIG. 1F from those shown in FIG. 1E are limited to the introduction of the home automation distributor 55 and particularly to the connection of the serial command line 6D between the video interphone or intercom 50 and the audio distributor 60 to include the home automation distributor 55 and a multiplexed signals fed via a twisted pair 6E.

The referenced video interphones, shopping appliance and home automation patents and applications disclose the propagation of multiplexed signals, selected from a group comprising audio, video, alarm, control, data and command signals including combinations thereof, via a single twisted pair 6E of FIG. 1F to the home automation distributor 55, for feeding the multiplexed signals via the connector 58 to a USB converter 80 associated with the home automation distributor 55 and shown in FIG. 2.

Yet another difference between FIGS. 1E and 1F is the power feed interconnection. Shown in FIG. 1F is a power feed to the audio distributor 60 through the home automation distributor 55. It is clear from FIG. 1F that the home automation system, the audio system and the intercom system can be powered by the same power supply and be integrated via simple interconnections using CAT 5 cables and twisted pair throughout. The further details of the system interconnections are shown in FIG. 2 and explained in the below descriptions.

FIG. 2 shows in details the system shown in FIG. 1F, including the interconnections of the integrated system combining the audio system, the intercom circuit of the video interphone or video intercom monitor 50 and the home automation distributor 55 of the preferred embodiment of the present invention.

The selector/encoder 100 of FIG. 2 includes the front panel 10 and the rear panel 16, with the front panel comprising operate touch, push or other keys 11, such as volume up-down keys, tone hi-low keys and channel up-down keys. The shown operation keys can be expanded to provide keys for many other function, such as fast forward, rewind, skip, stop, play, pause, preset and any other function or type of keys used with audio devices. The intercom touch keys 12 of the front panel 16 are represented by two keys only, open voice key for activating the hands free communication with the intercom and door open key for releasing an electric door lock (not shown) associated with the intercom system, for enabling a visitor or a deliveryman to enter the building. Other keys to operate other functions or features of the intercom can be added to the selector/encoder 100.

The five select touch or push keys 13 shown are for selecting the stereo signal source such as ipod, MP3, Blue-ray, CD, DVD, TV or radio or any other device for feeding music or sound signal to the selector/encoder 100, including such devices as players, recorders, television set-top box and others. Even though only five keys 13 are shown, any number of select keys can be added to the selector/encoder 100. The power key 13A is used to switch the selector/encoder on and off. The term "key or keys" hereafter refer to any of the operation or the select keys.

The shown IR receiver 14 is for receiving IR commands from the IR remote control 48. Even though FIG. 2 shows only IR remote control receiver 14 any other remote control receiver such as RF, ultrasound and/or wired remote control can be used instead. When wired remote control is used, a connector (not shown) for such wired remote control can be included in the front panel 10, the rear panel 16 or in other part or surface of the selector/encoder 100.

The rear panel 16 includes power connector 17, five stereo input jacks 18, stereo output jacks 19, five connectors 20 for connecting control and command signals to the respective devices and RJ45 connector 21 for connecting the selector/encoder 100 to the wall socket 9. Even though only five stereo input jacks 18 are shown, corresponding to the select keys 13, n number of stereo inputs and n number of select keys 13 can be used, enabling the connection of n number of audio playback, radio and/or TV devices. Same applies to the wired remote control connectors 20, n number of connectors for feeding wired control and command signals to the playback and other devices, such as television and radio can be incorporated, to provide the needed wired remote control connectors for the connected stereo input sources. However, if the playback and other stereo devices cannot be operated by a wired remote control signals the respective connector is either not used or not provided altogether.

The stereo output jacks 19 connect a selected stereo signals to a separate well known stereo amplifier (not shown) that operates independently from the audio system of the present invention. Here too, only one pair of stereo output jacks are shown, but the selector can provide for n output stereo jacks and it is possible to select and connect different input signal to each of the stereo output, or feed the same input signal to several or all the stereo outputs simultaneously.

The shown power connector 17 is for connecting the power supply 56 directly to the selector/encoder 100. The power feed methods and apparatus of the present invention provide for different power feed routs, shown in FIGS. 1A~1E as well as to power the different elements or units individually by a dedicated power supply 56, such as connecting the power supply 56 to the connector 17 for powering the selector/encoder 100 only.

The CAT 5 cables 6 connecting the selector/encoder 100 to the audio distributor 60 via the wall socket 9 and via RJ45 connectors 21 comprising four twisted pairs, the encoded stereo line 6A, the serial command line 6D, the intercom speaker line 6C and a power feeding line 6G that is otherwise used as a microphone line 6B, such as in the system shown in FIG. 1B.

The other CAT5 cable 6 connecting the video interphone or video intercom 50 to the audio distributor 60 and the home automation distributor 55 does not use RJ45 connectors and instead it connects directly to the two distributor's terminals and ports, with the microphone line 6B is connected to the terminal 56 and the intercom speaker line 6C is connected to the terminal 57 of the audio distributor.

The serial command line 6D is shown connected to the terminal 53 of the home automation distributor 55, but can be connected to terminal 53 of the audio distributor 60 instead. It makes no difference to which distributor the serial command line is connected to, because both terminals 53 of the two distributors 60 and 55 are tied together via line 6D in parallel into the two terminals or ports 53. The forth twisted pair line 6E is connected to the home automation distributor terminal 54 that feeds the multiplexed line signals propagated from the video interphone system to the connector 58. The shown connector 58 is in practice the same RJ45 connector discussed above.

The multiplexed signals fed through the line 6E include video, audio, data, command, control and other signals that are explained in details in the video interphones and the shopping terminal patents and applications referenced above, and are fed to an interface unit such as the USB converter 80 via CAT 5 cable 59. The USB converter 80 feeds the USB converted signals to a PC or to a network communicator 83 via a standard USB cable assembly 82.

The PC 83 can communicate via ADSL or other interfaced connection 84 and via the Internet or other networks 85 for communicating with other PCs or Personal Digital Assistant devices (PDA) or cellular phones, including the transmissions of the video images generated by the entry panels of the video interphone or video intercom system.

The USB converter 80 enables communications between visitors at the building entrances and tenants being in remote locations and/or provide the tenants the means to control the appliances of their home automation system remotely.

Moreover, bed ridden elderly or handicapped and/or the sick can generate an alarm or emergency and/or ask family members for help via the integrated audio-intercom system and through the PC 83, using the audio system's hands free voice communications of the present invention.

Similarly, the audio system of the present invention provide for connecting the elderly and the sick directly to their designated hospitals or medical doctors for communicating their needs and medical conditions via the intercom system and/or via the PC 83 over the Internet. When the camera 50A and/or any combination of medical devices such as monitors, sensors, diagnosis, analysis, applicators, treatment, life support and rehabilitation 50B for monitoring and treating the bed ridden or the sick are connected to the video interphone monitor 50, via the interface 80, and/or the PC 83 the images, the voice and/or the monitored data of the caller, such as heartbeat and blood pressure of the caller are communicated simultaneously via a network 84 or the Internet 85 to a hospital, doctor or an emergency service station, allowing nurses, the doctor and/or the emergency station to operate the medical devices and other emergency devices remotely.

The interface or the USB converter 80 and/or the PC 83 includes a well known video signal processing programs for feeding the video signals generated by the video intercom or video interphone's entrance panels to the television set-top box or cable box or the antenna line, or directly to the television video inputs terminals whenever a visitor calls the apartment. At the same time the intercom call activates the home automation IR drivers to generate a command to switch on or switch over the television to display the visitor image, thereby expanding the intercom system to include video displays onto the television sets, controlled by the home automation system.

The power supply 56 connects to the home automation distributor via terminal 51. A parallel terminal 51 links or connects the power to the terminal 51 of the audio distributor 60 and the distributor 60 links or feeds the power to the selector/encoder 100 through the twisted pair line 6G of the CAT 5 cables 6 and the wall socket 9. Yet, as explained above it is also possible to feed the power to the selector/encoder 100 via the encoded line 6A of the CAT 5 cable assemblies 6.

Similarly, the audio distributor 60 feeds the power to the speaker 90 via the stereo encoded line 6A. Alternatively the audio distributor 61 shown in FIG. 11 feeds the power to the speakers 92 of FIG. 5B via a twisted pair 6G and via the terminals 3. It becomes clear that the interconnections between the audio components, the intercom circuit, including the video interphone 50 and its related components such as the camera 50A and/or medical device or devices 50B and/or alarm and other devices can be connected and integrated with the home automation system, using twisted pairs in a simple cascading chain, including the power feed and that the integrated audio with the video interphone or intercom including the cameras, medical monitoring 50B, alarm and emergency devices (not shown) can be operated through the home automation control and command network, including the remote access and control via a network and/or the Internet 85.

Communication equipment installers, such as networks and telephones installers engaged with CAT 5 cables, prefer to terminate the CAT 5 cables with standard connectors such as RJ45 and not tie up separated individual color coded twisted pairs of a CAT 5 cable into terminals. For such fitted CAT 5 cables interconnections FIG. 3 shows a combined distributor 200 and speakers 290 and 299 for integrating the audio system and the video interphone or intercom system with the home automation of the preferred embodiment using cascaded fitted CAT 5 cables throughout.

Figure 3:
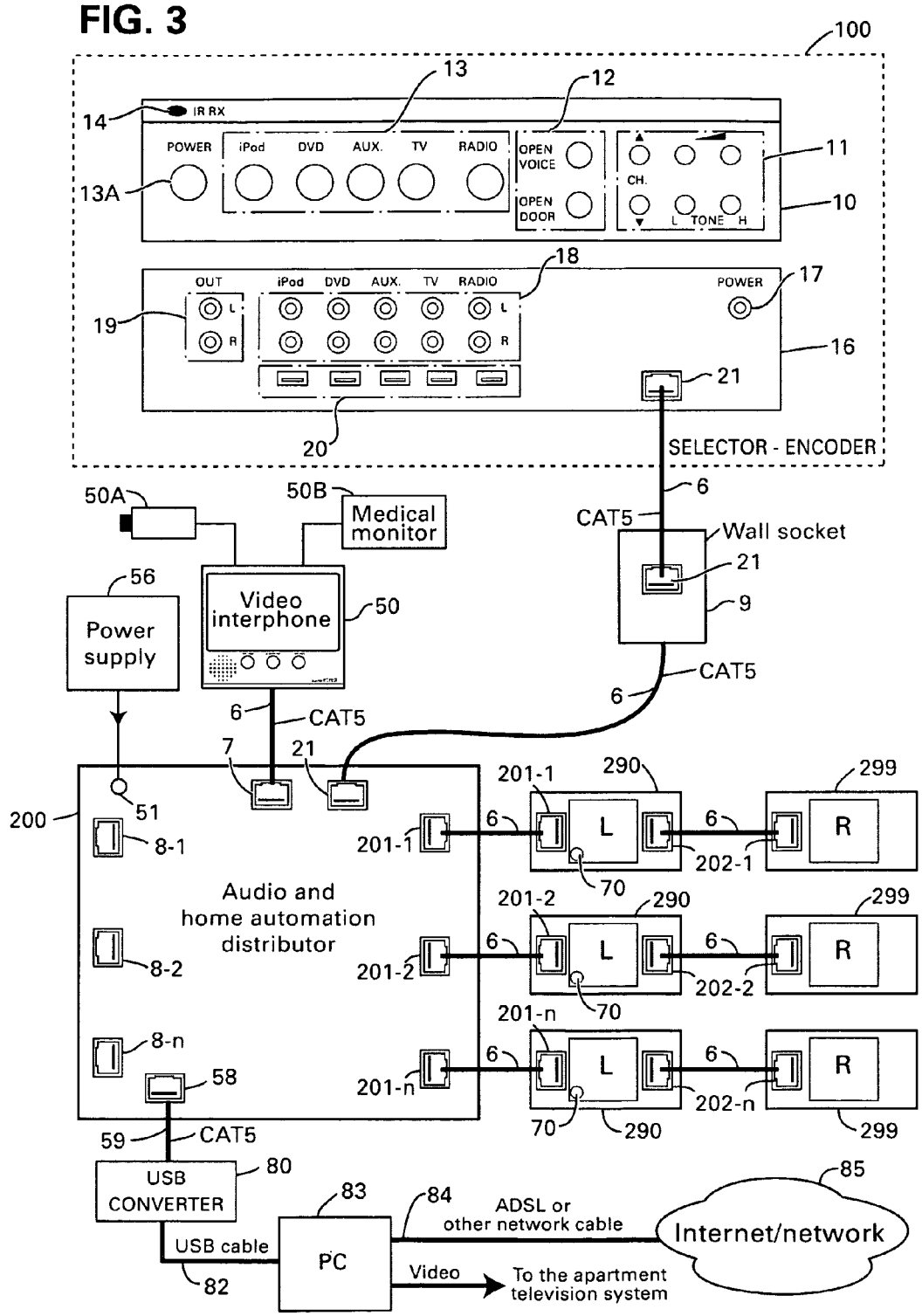
FIG. 3 is a block diagram of the system interconnections shown in FIG. 2 using standard connectors and CAT 5 cables throughout, including a combined distributor of the present invention.

The combination distributor 200 shown in FIG. 3 combining the two separate distributors 55 and 60 shown in FIG. 2. and the speakers 290 and 299 include standard connectors such as RJ45 for the whole integrated system, using standard cable such as the CAT 5 cable 6, fitted with RJ45 21 or other standard or custom made connectors. While the speakers 290 and 299 and the combined distributor 200 are disclosed in details later, the system of FIG. 3 clearly shows that the whole integrated system can be installed by IT installers conveniently and without error and that the system operation and controls shown in FIG. 2 are identical with those of the system shown in FIG. 3.

FIG. 4A shows the left speaker 90 of the systems shown in FIGS. 1A~1F and FIG. 2. As stated above the references to the left speaker in the specifications and the drawings are for convenience only. Whenever a reference is made to left or right speakers, the audio amplifier output channels or to the speaker connectors, the reference left and right is an example only, describing the one audio channel or the other. The left-right terms are reversible, wherein left can be read as right and right can be read as left.

Terminals 1 of FIG. 4A connect the speaker assembly 90 to the line 6A of FIGS. 1A~1F, and to terminals 1-1~1-n, via line 6A of FIG. 2, wherein the twisted pair line 6A carries DC power and propagates the encoded stereo signal to the speakers along with a two way multiplexed serial commands signals to and from the speaker assembly 90.

The speakers 90 shown in FIG. 2 include the microphone 70 shown in FIG. 4A that propagates a multiplexed microphone signals from the speaker to the audio distributor 60 and to the selector/encoder 100 via the wall socket 9 and via the same line 6A. In FIGS. 1B, 1E, 1F and 2 the microphone 70 signal is multiplexed and fed to the distributor 60 via the line 6A and is fed from the distributor to the intercom microphone terminal (not shown) directly via line 6B.

The microphone 70 of the speakers 90 as well as of the speakers 91, 92 and 291 of FIGS. 4A, 5A, 5B and 6A respectively, cannot be operated when music signal is fed to the speakers. This is because the microphone 70 will be overwhelmed by the sound generated by the speaker. For this reason the preferred embodiments of the present invention mutes the music or switch off the sound propagated through the speakers 90, 91, 92 and 291 when the microphone is activated. This enables simple multiplexing of two signals only, the encoded stereo signal multiplexed with the two way serial commands, or the microphone signal multiplexed with the two way serial commands.

There are many well known multiplexing techniques and methods. The preferred embodiment explained below uses well known band separation to multiplex the two only signals, out of the three, i.e., the encoded signal, the microphone signal and the serial command signal, for example 30 Hz~90 KHz for the encoded stereo signal, 100 KHz~150 KHz for the two way command signal and 200 KHz+10 KHz for the FM modulated microphone signal.

The circuits to separate the signals includes well known band pass, low pass and high pass filters by employing coils and capacitors and/or using digital filters when digital signal are propagated. The circuits to inject and extract the signals are all well known circuit that are widely available in IC packages, or are designed into software programmed circuits of a gate array and/or FPGA. The multiplexed signals are fed to or extracted from a differential transmission line, i.e., the twisted pair line 6A that carries DC power to the speakers 90 or 91, and/or to the selector/encoder 100.

The circuits feeding and separating the DC power from the signals propagated over the same twisted pair line 6A employ well known filters, coils and capacitors that remove the signals from the DC power, inject and extract a selected or all the multiplexed signals. The circuits such as the circuit 71 of FIG. 5A, circuits 32A of FIG. 5B, circuit 35A of FIG. 9 and circuit 35B of FIGS. 10 and 12 for feeding and/or extracting DC and for separating/extracting multiplexed signals are fully disclosed in the U.S. Pat. No. 5,923,363 and are incorporated herein by reference.

Figure 5A:
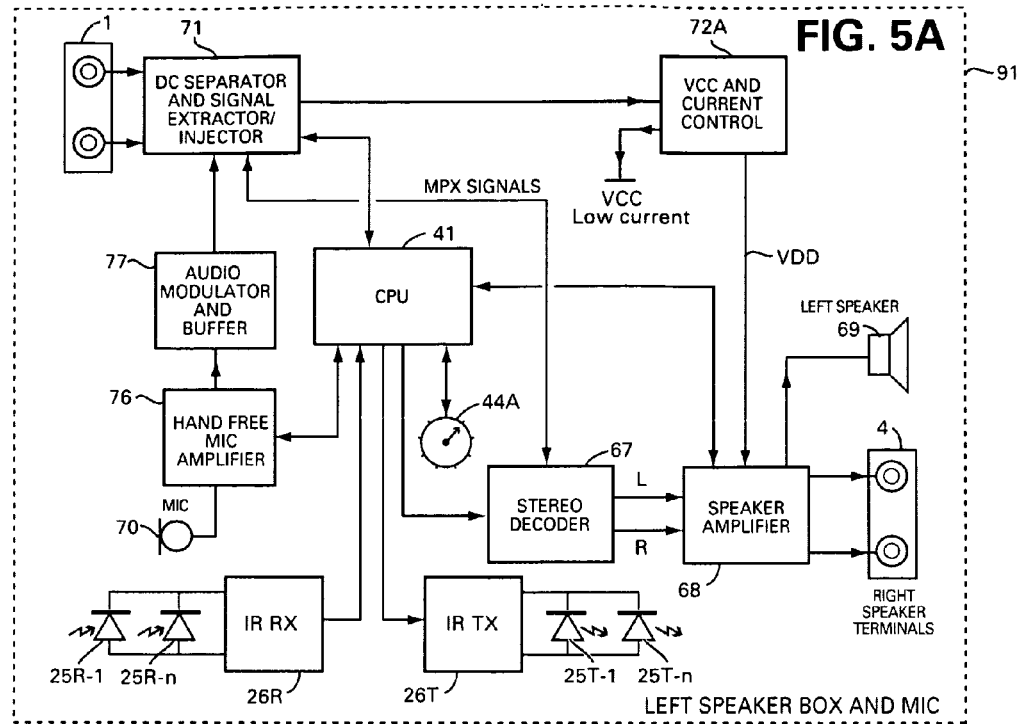
FIG. 5A is a block diagram of the speaker shown in FIG. 3A without rechargeable battery with limited sound output power.

Accordingly, the separated DC power is fed from the circuit 71 to the current control circuit 72 of FIG. 5A. The current control 72 outputs the VCC, a regulated voltage source for powering the entire circuits of the speaker assembly 91, with the exception of the speaker stereo amplifier 68. The speaker amplifier 68 is fed by a controlled voltage and current VDD that limits the current to a given value, such as 0.3 A. This limits the audio power output that is fed to the speaker 91 and its pair 99 shown in FIG. 4B. The audio power output depends on the audio signal content and the audio signal level, therefore as the music signal is a varying signals and levels, a varying current drain by the speaker amplifier 68 is unavoidable.

The power feed to the speaker pair 90 and 91 via the twisted pair line 6A carrying multiplexed signals is only possible when the DC current is fixed and constant. This is because a variation in the DC current drain directly cause variations and deformation of the differential signal propagation. For this reason the current drain must be maintained fixed and constant.

Figure 8:
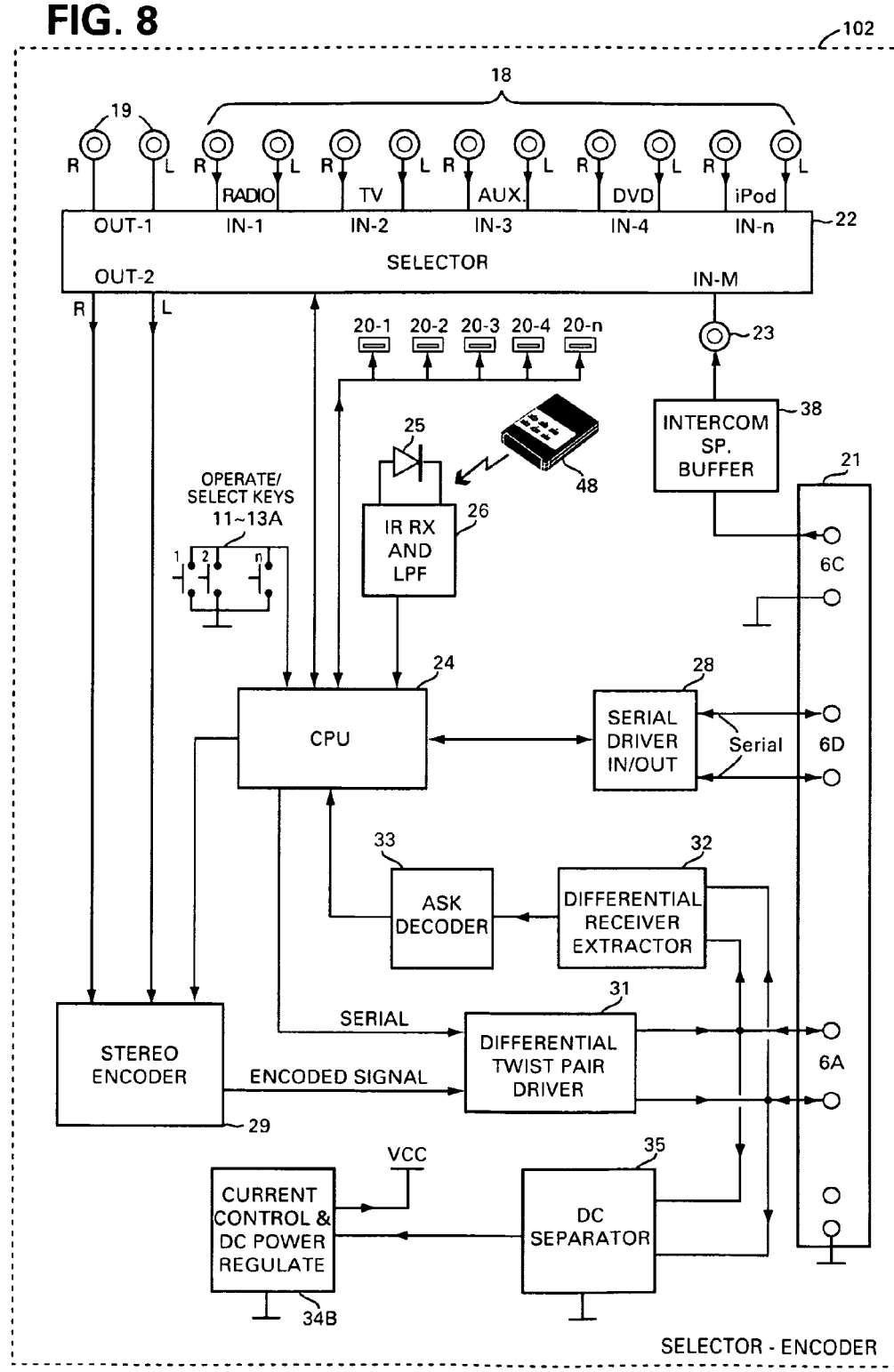
FIG. 8 is modified block diagram of the selector/encoder of the present invention, powered by a low current drain fed through the encoded signal line in reverse direction to the encoded signal propagation.

For example feeding the selector/encoder 100 via the twisted pair line 6A that consume steady current with minor current variations can be powered with no limitation, because the current control using well known DC power regulator circuit 34B of FIG. 8 controls the current fed via the DC separator circuit 35. To prevent minor variation in current drain the circuit 34B is calculated to drain higher current, such as 10% more than the actual calculated current consumption, and shunt the unused current portion via an adjustable dummy load. For example, if the calculated consumption of the selector/encoder 100 is 120 mA the DC power regulator 34B is designed to drain 132 mA, using the 10% over current of 12 mA to be shunted via an adjustable dummy load of the circuit 34B. By this it is possible to drain steady current through the encoded and multiplexed line 6A and ensure that no current fluctuation due to signals, temperature, and/or component tolerances will affect the signal propagation.

Such current control circuit is used by the speaker 91 of FIG. 5A, however the current fluctuations by the speaker amplifier 68 mandates a limit to the current control and shunting range. For this reason the power output of the speaker amplifier must be limited to a value that its current falls within the control range of the current control 72A. For example, a maximum current of 0.2 A and a DC voltage level of 10V, it is possible to output some 1.5 W of a good sound quality, which is more than needed for playing background music in a living room of a given apartment.

FIG. 4A shows the speaker assembly 90, which is similar to the speaker assembly 91 with the exception of the battery control circuit 73 and the rechargeable battery 74. The constant fixed current drain controlled by the current control circuit 72 is the same as the constant fixed current drained by the speaker 91 via the current control 72A, with the battery control circuit 73 is the adjustable dummy load of the current control 72.

The maximum fixed constant current is drained by the speaker assembly 90 regardless if the speakers are switched on or off. When the speakers are off most of the current drain is used to charge the rechargeable battery 74. When the speakers are switched on with a low level output, the current to the speaker amplifier 68 is fed through the battery control circuit 73, shunting the unused current to the battery 74 for continued charging.

As the current drain by the speaker amplifier 68 increases to higher audio power output, the current fed to charge the battery 74 decreases or is completely cut. When the current is further increased to allow for yet higher output power, the battery control 73 will reverse its current path to feed the additional current drain from the charged battery. By such battery control circuit 73 and the rechargeable battery 74, associated with the speaker 90, it becomes obvious that the speaker 90 can generate higher audio output sound exceeding the fixed and constant current that is fed to speaker 90 via the twisted pair line 6A without disturbing the propagated signals including the encoded stereo signal and the two way serial command signal.

Here too, the video interphone U.S. Pat. No. 5,923,363 discloses a rechargeable battery and a battery control circuit used for operating the video interphone, the content of which is incorporated herein by reference. The other powering method disclosed by the U.S. Pat. No. 5,923,363 patent is the direct connections of power supply to the monitors, same applies to the speakers of the present invention.

Figure 5B:
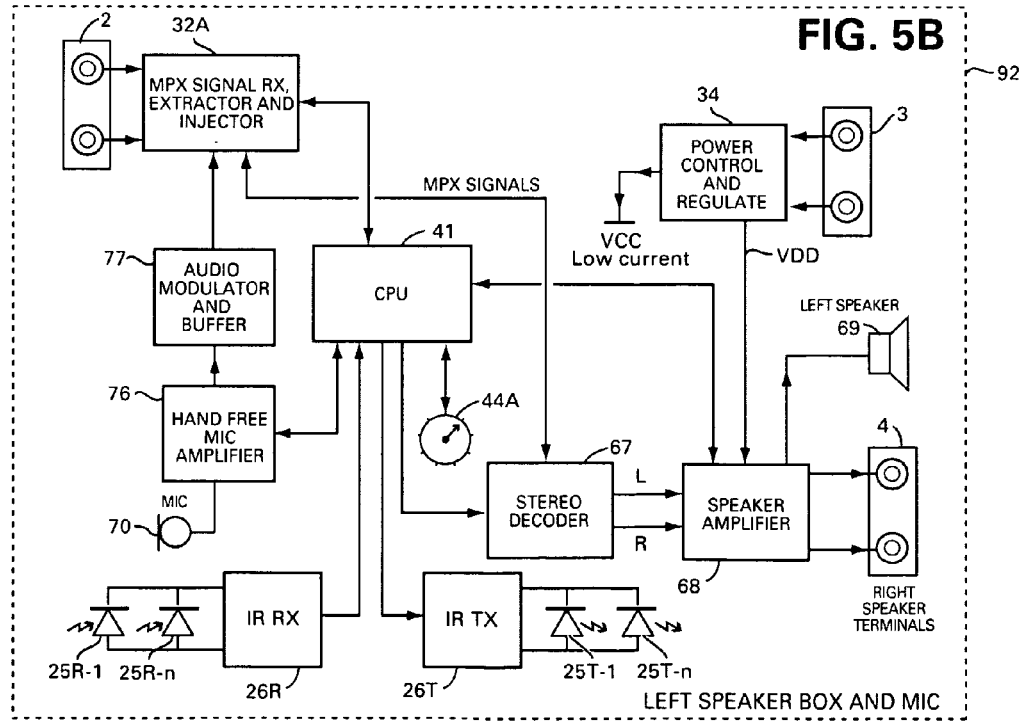
FIG. 5B is another block diagram of a left side speaker with a microphone of the preferred embodiment that is powered via separate power line with high sound output power.

The speaker assemblies 92 of FIG. 5B, 290 of FIG. 6A and 299 of FIG. 6B are all powered via a separate power line, using a twisted pair of a standard CAT 5 cable, such as line 6G. FIG. 5B shows the power terminals 3 for linking or connecting the power line 6G. The entire circuit or the block diagram of the speaker 92 of FIG. 5B is similar to the speaker 91 of FIG. 5A with the exception of the power feed circuits.

The direct power link or feed is controlled by a well known power control and regulator circuit 34, including a well known switching regulator or an analog regulator using standard ICs, diodes, transistors and other discrete components for outputting regulated voltage source VCC that feeds all the circuits of the speaker 92 excluding the speaker amplifier 68 that is shown fed by VDD, which is a regulated voltage line for a wide current fluctuating drain needed to operate the amplifier at full volume at its rated output. Another difference is the removal of the DC separating circuit portion of the circuit 71 of the speaker 91 shown in FIG. 5A.

The circuit 32A of the speaker 92 does not include the DC separator circuit portion. The speakers 90, 91 and 92 of FIGS. 4A, 5A and 5B include identical circuits 71 or 32A for extracting the encoded stereo signal and the serial command signal one way, and for injecting the microphone signals and the serial command signal in the opposite direction. The stereo decoder signal 67, which is a well known stereo decoder IC, and available in great variety at low cost, such as stereo decoders used for stereo FM radio. When the encoded signal is a compressed audio digital signal the stereo decoder will be an IC containing digital stereo decoder, such as used in MP3, ipod, or CD players, or such decoding program can be installed into a DSP device (not shown) or into the CPU 41.

The output of the stereo decoder 67 is fed to the speaker amplifier 68 that feeds its left channel output to the left speaker 69, as explained above the speaker 69 can be either right or left speaker. The other output channel of the speaker amplifier feeds the right, or left as the case may be, speaker via the terminals 4 for connecting the other speaker via a twisted pair 6F. The shown speaker 99 of FIG. 4B is the right, or left as the case may be, that connects via its terminal 4 the other end of the twisted pair line 6F. The speaker amplifier 68 is a well known stereo output amplifier that is controlled by serial commands or protocols and is available in IC packages by different manufacturers. Similarly the stereo decoder 67 is also controlled by serial commands.

It becomes clear that the encoded stereo signal propagated via the twisted pair line 6A is extracted, decoded, amplified and fed to a pair of left-right speakers, via a cascading twisted pair.

The multiplexed serial command signal, such as the well known RS422 or RS485 is fed to the speaker over the encoded stereo signal line 6A, it is extracted by the signal extractor circuit 32A or 71 and is fed to the CPU 41. The serial command signals comprise coded commands, also known as protocols that include for example protocols for commanding power on, power off, mute, volume up, volume down, tone high, tone low, balance left, balance right, right channel mute, left channel mute, hands free microphone activate, talk, listen, door open and many other commands for operating the video interphone or the intercom and/or the home automation system. The protocols or commands can also be fed to the CPU 41 via the IR receivers 25R-1~25R-n and via the IR RX 26R. The IR remote control commands processed by the CPU 41 and the IR transmitters are explained later.

The term "residence information signals" in the following description and the claims refers to propagation of individual signals, such as video only, audio only, encoded signal only, serial signal only, microphone signal only, intercom speaker signal only, remote control signals only, alarm signal only, data signal only, control signal only and/or to combinations thereof, multiplexed and propagated via one or more twisted pair, wherein said serial signal may comprise commands, control, status, data, remote control, digital audio and digital video. Said encoded signal comprises encoded stereo, encoded monaural audio signals and combinations thereof and wherein the reference to remote control signal can be a wireless propagated signals such as IR or RF and wired remote control such as propagated with the serial signals in combination with an home automation propagated serial signals.

The audio system programmed command protocols including the home automation and the video interphone or intercom protocols are listed into a lookup table and stored into the memory of the CPUs 41 and 24 for enabling the processing of any commands extracted from the propagated multiplexed serial commands signal and/or the received IR remote control commands. This enables the speakers, the audio distributors 90~95 and 200 and the selector/encoder 100~103 to process, control and communicate with the intercom and/or to propagate commands relating to the home automation and the audio system in other rooms or zones of the apartment and/or to propagate commands for operating the intercom circuits, such as opening the main or other doors of the building and/or to generate emergency and alarm, and to communicate such alarm, emergencies or medical conditions with e-stations such as e-service, e-alarm, e-medical and/or e-hospitals and/or e-shopping via a network or the Internet.

The CPU 41 processes all the received commands, regardless if they are addressed to the room or zone of the speaker assembly or not. The CPU 41 will, according to the lookup table, generate IR control commands for example to operate home appliances of the same room or zone, or will relay control command addressed to other room or zone. Commands addressed for operating the speaker, the audio system and/or the intercom system in the room or zone in which the speakers are installed will be executed by the speaker's CPU 41, including the control and operation of the stereo decoder 67, the speaker amplifier 68 and the hands free amplifier 76.

Figure 7:
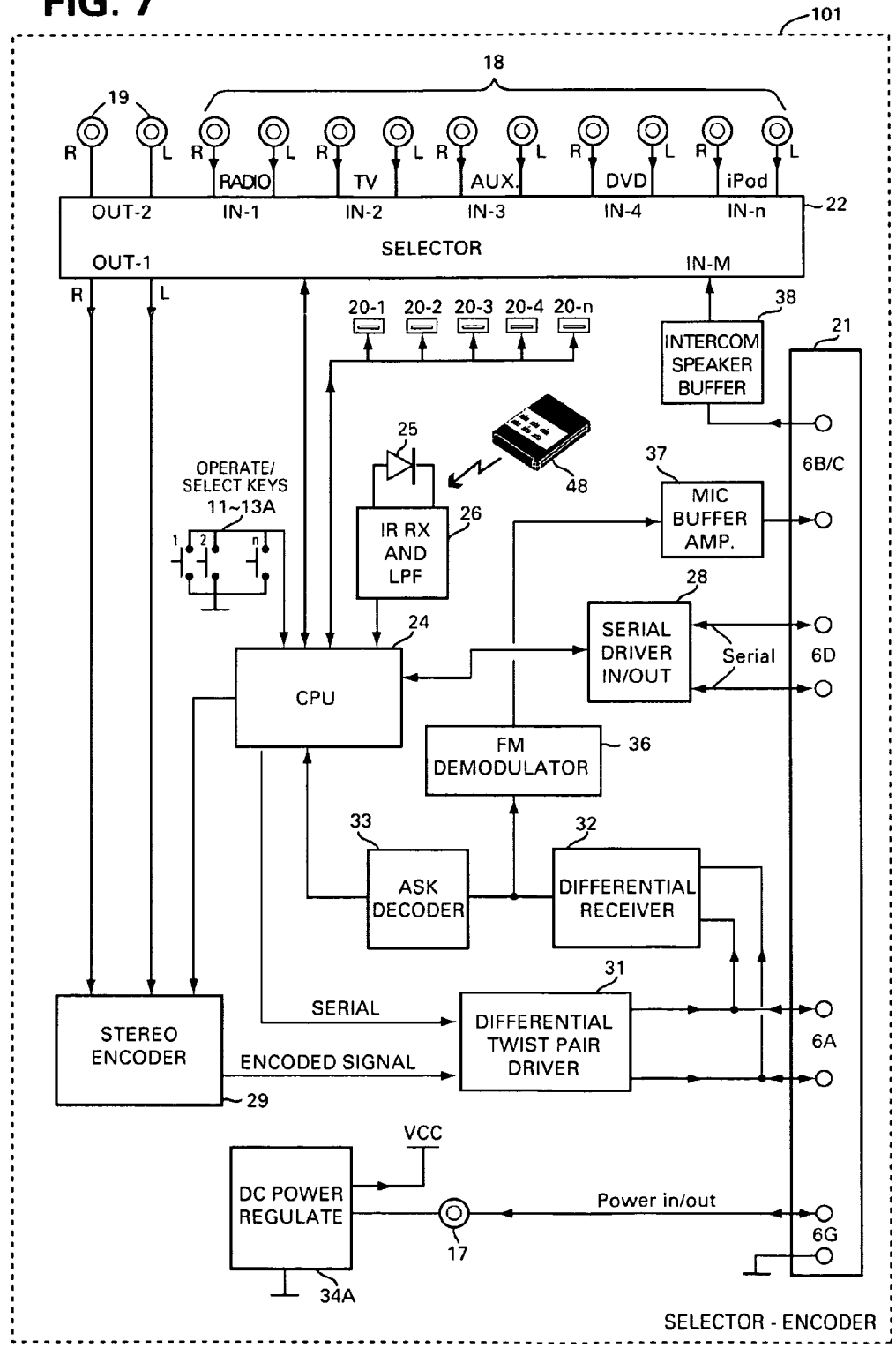
FIG. 7 is a block diagram of a selector/encoder of the preferred embodiment of the present invention for interconnecting the audio system of the home automation with the intercom system.

As explained above, the music must be muted or cut to enable the microphone 70 communicate with the intercom and when the video interphone or the intercom 50 generates a call command, a given scenario may be to automatically connects the intercom speaker via the input IN-M of the selector 22 of FIGS. 7 and 8 to the output port OUT-2, thereby cutting the music source from the encoder 29 by switching over from the music source fed to the encoder with the intercom speaker signal fed via the line 6C. Simultaneously the CPU 24 switches the stereo encoder 29 into monaural mode for propagating the intercom speaker signal to the right speaker channel.

The intercom call command is also received, extracted and fed by the signal extractor of the circuit 71 or 32A, of the speakers 90, 91 and 92 shown in FIGS. 4A, 5A and 5B, to the CPU 41 of the referenced speaker assembly, for initiating the speaker's intercom call mode, wherein the CPU 41 commands the speaker amplifier 68 to mute the left channel output and generate a call or ringing tone through the right output channel of the speaker amplifier 68. The call or ringing tone can also be a selectable stored melody or a chime sound with selectable duration, all stored in the memory of the CPU 41. Immediately after the call tone has stopped the speaker shown in 4A, 5A or 5B is commanded by the CPU 41 program to enter into an intercom wait mode.

There are several communication scenarios possible during the intercom call or wait mode. Another scenario provides for the right speaker 4B to output the voice of a visitor standing in front of the intercom entrance panel, the microphone 70 however is muted until a tenant touches the open voice key 12 or the open voice key of the IR remote control unit 48. This opens the well known hands free communications, in which the microphone and the speaker will operate alternately.

The hands free control circuit 76 fed by the microphone 70 is a well known circuit, available in many different IC packages, such as used in wired or wireless telephone systems.

The hands free microphone amplifier 76 feeds a status signal to the CPU 41 with its command receiving input is continuously ready for receiving the CPU 41 commands, such as switch on, switch off, talk, listen, wait and mute. At the same time the CPU 41 controls the stereo decoder 67 and the speaker amplifier 68, which enables the CPU 41 to fully manage the hands free open voice communication, remove acoustic howling and feed back, increase or decrease the volume of the speaker or the microphone or both.

The ability to control the hands free communication between the video interphone or the shopping terminal of the referenced patents and application or any other video intercom or intercom of a building through the audio system of the present invention via the speakers and the microphones described above opens a whole new remote voice communications opportunities, particularly for bed ridden, sick and the elderly needing attention, for example in a nursing buildings or homes for the elderly and the bed ridden. The CPU 41 is programmed to enable a "care taker" desk to remotely feed an "open voice" serial command to the audio system of an apartment of a bed ridden tenant that is unable to do so by himself, giving the care taker desk, a medical doctor or an hospital the ability to remotely monitor and communicate with a bed ridden or other care needing tenants.

Yet, another scenario is to add a "talk" key to the IR remote control 48, enabling a hearing impaired tenant to switch over from a listen mode to talk mode, by pressing the talk key. This eliminated the speaker to microphone acoustic loop and feed back altogether, and provide for increased volume of the speaker amplifier 68, thereby providing for high volume sound level communications to the hearing impaired and the elders. It becomes clear from the above that different scenarios and communication processing programs can be incorporated into the CPU 41 and its memory, and be made selectable. It should be note again that the references above to left-right speakers are for convenience only and that the left-right terms are reversible as the case may be.

The amplified microphone signal outputted from the hands free amplifier 76 is fed to a modulator and output buffer 77, a well known FM modulator having a carrier frequency such as 200 KHz, and an output buffer for feeding the FM modulated microphone signal to the signal injector or inserter circuits 71 or 32A. The signal injector or inserter can be a coupling capacitor or an RF signal transformer and a well known differential line amplifier for feeding the FM modulated microphone signal to the twisted pair line 6A and for propagating the microphone signal in reverse direction to the encoded stereo signal propagation. Even though FM modulation is the modulation of the preferred embodiment of this invention any other modulation such as AM, SSB or PM can be used instead, moreover when the microphone signal is a digital signal, a modulation such as the well known digital modulation OOK, ASK, FSK, PSK technique can be used, or any other processing of the digital signals used in a data transmission and/or multiplexing.

As explained above, the encoded stereo signal is muted when the intercom communication is active, therefore the multiplexing is limited only to the FM modulated microphone signal and the serial command signals. Further details of the signal extractor injector or inserter are described in the video interphone U.S. Pat. No. 5,923,363 and are incorporated herein by reference.

The serial commands fed to and from the speakers 90, 91 and 92 shown in FIGS. 4A, 5A and 5B are extracted and inserted by the signal extractor injector or inserter 71 or 32A fed to and from the CPU 41. Serial command signals such as the well known RS422 or RS485 that are transmitted over a differential signal line, such as the twisted pair line 6D are used in the preferred embodiment of the present invention, however any other control and commands signals can be used, such as DTMF or line coding and/or modulated data such as PCM and/or compressed data or other scheme to propagate commands between the audio components of this invention, the video interphone or intercom 50 and/or the home automation explained above and detailed in the home automation patent applications referenced above.

The serial commands include an address such as room or zone address, set via a digital rotary or DIP switch 44 or via other address setting process, such as hardware jumper setting or installing the address into a memory of the CPU 41 of the left speakers assemblies. As will be explained later the audio distributor 60 also provides address setting for each distributed stereo encoded line 6A.

Another novel item of the present invention is the IR receivers 25R and the IR transmitter 25T shown in FIGS. 4A, 5A, 6A and 6B, wherein n number of IR photo transistor or pin diodes 25R-n and IR LEDs 25T-n can be incorporated into the left speaker and/or the right speaker such as shown in FIGS. 6A and 6B. The IR photo transistor or pin diodes 25R receive the commands from the IR remote control unit 48 and feed the received commands via the IR RX circuit 26R to the CPU 41, which operates the stereo decoder 67 and the speaker amplifier 68 in accordance with the command received, or the CPU 41 will regenerate commands that are intended for operating an home automation appliance in the same room or zone and direct the regenerated command, on the basis of the lookup table referred to above, to the transmitter circuit 26T that feeds an IR remote control current signal to the IR LEDs 25T-1~25T-n, thereby becoming an IR remote control driver such as described in the reference U.S. patent application Ser. No. 11/939,785, the details of the disclosed IR drivers are incorporated herein by reference.

When the IR command received by the IR receiver 25R is addressed to another room or zone the CPU 41 will process the command and feed a serial command, on the basis of the lookup table, to the injector or inserter circuit 71 or 32A for propagating the processed serial command via line 6A to the audio distributor 60 and/or the home automation distributor 55 and/or to the video interphone or intercom 50 and/or to the selector/encoder 100, thereby the speaker assembly 90, 91 and 92 of FIGS. 4A, 5A and 5B become an IR distribution driver for propagating IR commands throughout the audio, home automation and video interphone or intercom combined. The IR photo transistor or pin diodes 25R-n and the IR LEDs 25T-n can be made rotatable and adjustable, similar to IR drivers disclosed in the patent application Ser. No. 11/939,785, incorporated herein by reference, thereby become a novel appliance, an IR driver with speaker assembly.

It is of course possible to use the IR drivers of the home automation, outside the speaker, to remotely control the system via the serial command signal of the integrated system. It is also possible to propagate wired or RF remote control and data signal within the integrated system for automatically addressing the intercom by an alarm, emergency or medical devices associated with the intercom and/or the home automation system. Such devices shown in FIGS. 2 and 3 as the camera 50A and the medical monitor or other medical devices 50B are connected to the video interphone or intercom 50, instead they can be connected for exchanging remote control signals for operating the medical devices to the interface or USB converter 80. The video interphone referenced patents disclose an RF transceiver for communicating with emergency, alarm and medical devices.

It is clear from the above explanation that the speaker assemblies shown in FIGS. 4A, 5A and 5B, and as will be explained later, also the speaker assemblies shown in FIGS. 6A and 6B can receive encoded stereo signal propagated via a single twisted pair line 6A for outputting controlled stereo sound or monaural intercom sound and feed a returned microphone signal to communicate with the intercom system over the same line 6A. It is also clear from the above that the speakers can be controlled by the home automation system, the video interphone system and via an IR or any other remote control device. It is also clear that the speaker assemblies of the present invention can become an IR driver system for propagating IR remote controls for controlling and operating the audio system, the hands free microphone signal communication, the communication and the operation of the video interphone or intercom system and/or for operating the home automation system of the apartment.

Figure 9:
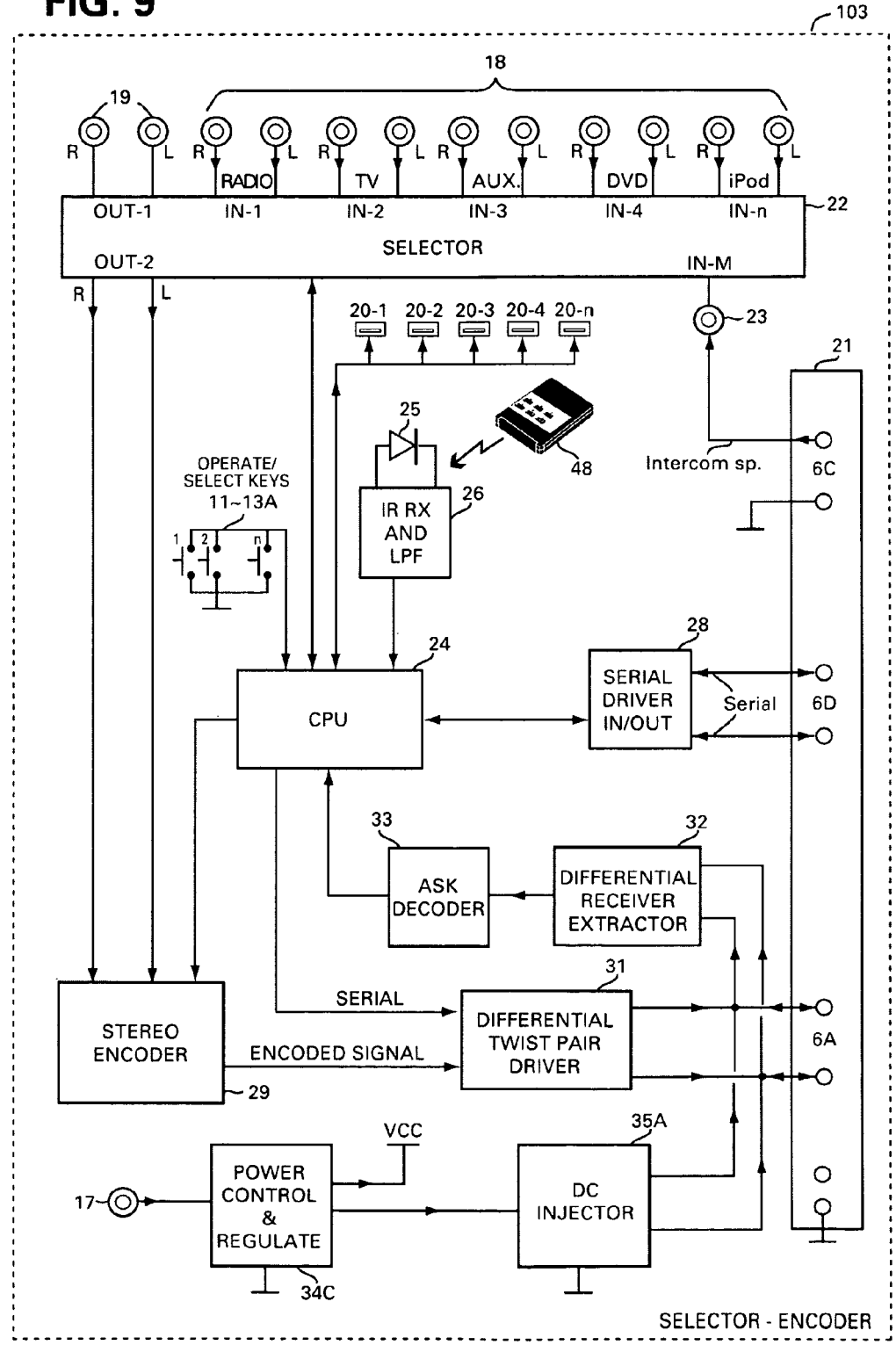
FIG. 9 is yet another modified block diagram of FIG. 6 showing a power fed through the encoded signal line from the selector/encoder to a speaker.

The selector/encoder 100 shown in FIGS. 1A~1F, FIG. 2 and FIG. 3 is a selector/encoder that combines all versions and combination possibilities. Shown in FIGS. 7, 8 and 9 are three block diagrams of the selector/encoders 101, 102 and 103 respectively, each shows different power feed and different circuits and connections for connecting the intercom speaker and the microphone signals. The speaker and the microphone signals of the preferred embodiment are analog signals that are commonly used by intercom systems for interconnecting more than one intercom handset or panel inside a given apartment. Such common intercom speaker and microphone signals are connected between ground line, the microphone line terminal and the speaker line terminal such as the terminals 56 and 57 shown in FIG. 10. Because the impedances and signal levels must match the corresponding output and input of the audio system, the microphone and the speaker signals and lines must be buffered, using an input line buffer 38 for the speaker signal and an output signal buffer 37 for the microphone signal. By such buffers the lower impedances and higher signal levels of the analog speaker and microphone signals of the commonly used intercoms are matched with the higher impedances and lower signal levels used for audio signal propagations.

Similar buffer circuits are needed for interconnecting common intercom system with the audio system of the present invention when the signals propagated are all digital. However when the intercom system uses digital audio propagations the buffer circuits 37 and 38 will include D/A (digital to analog) and/or A/D (analog to digital) converters and include DSP devices or a digital audio processing programs that are installed into the CPU 41 or 24 to ensure compatibility between the processed signals of both the intercom and the audio systems.

Figure 10:
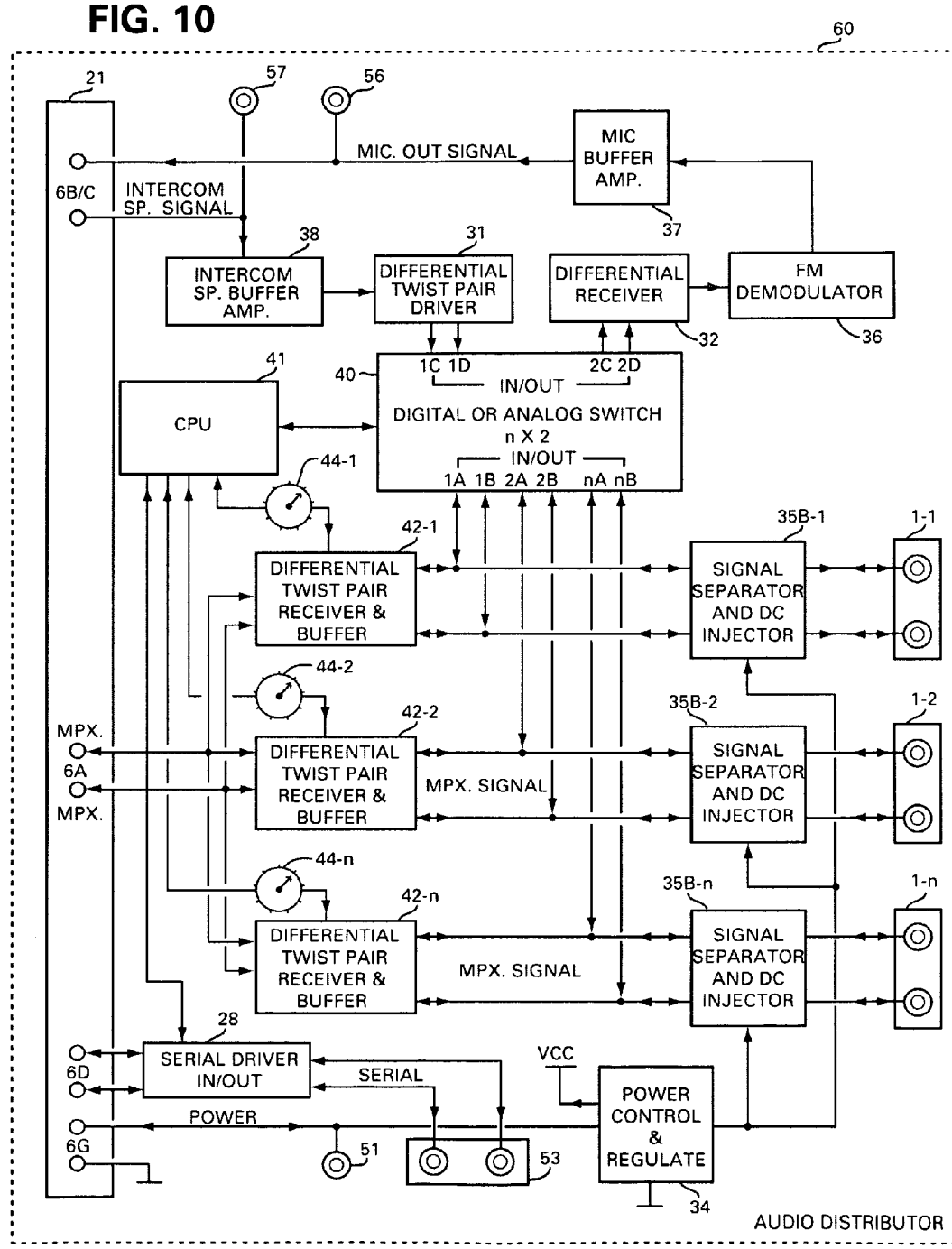
FIG. 10 is a block diagram of the audio distributor of the preferred embodiment of the present invention, with interconnecting circuits for the intercom system and with power feed to the speakers via the encoded signal lines.
Figure 11:
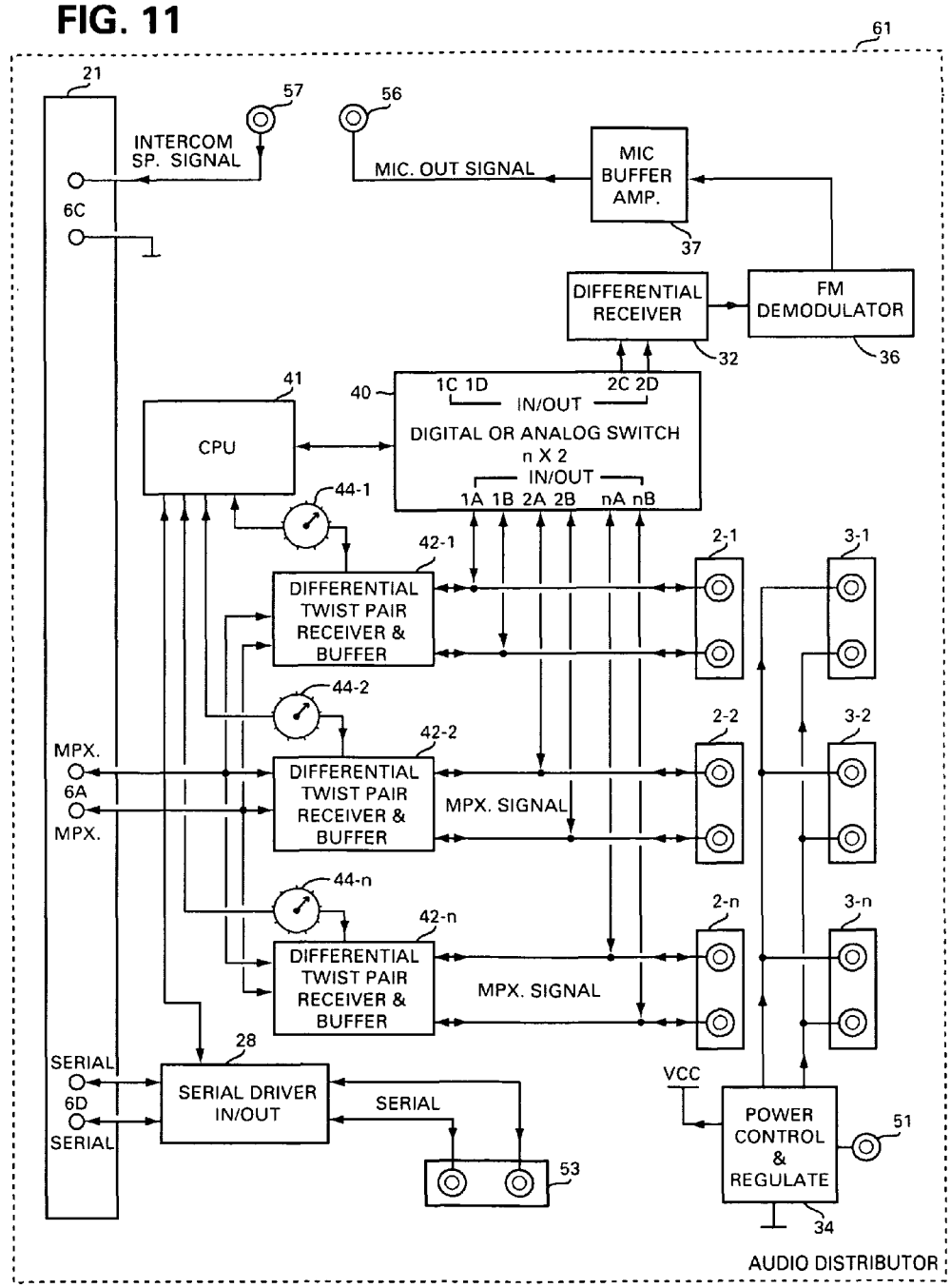
FIG. 11 is a modified block diagram of the audio distributor of FIG. 10 with a power feed to the speakers via separate power lines.
Figure 15:
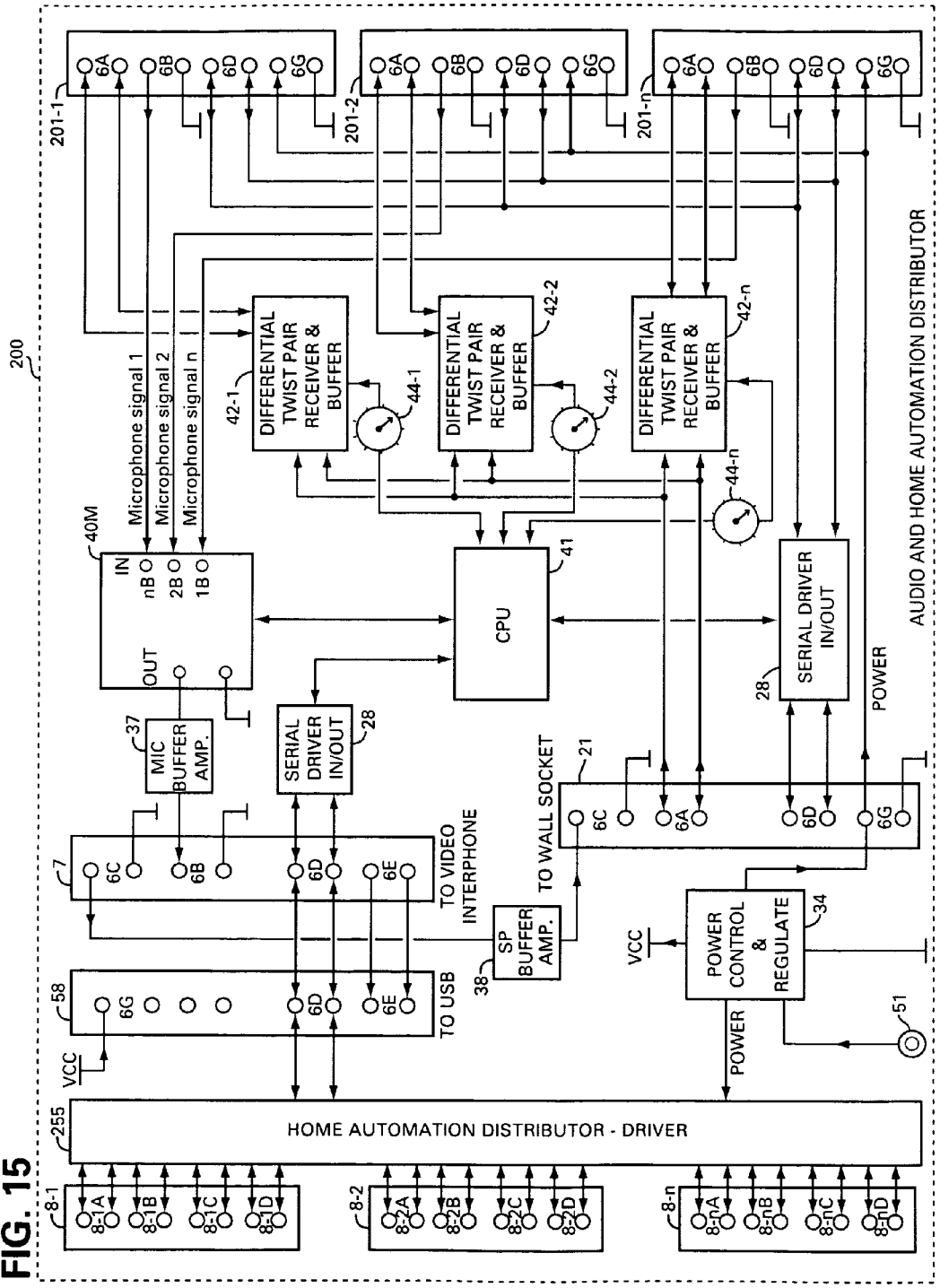
FIG. 15 is a block diagram of the combined audio and home automation distributor of the present invention including standard connectors for connecting the video interphone monitor, the audio components and the home automation components.

Because some of the buffer amplifiers 37 or 38 or both may be included in a speaker assembly such as 290 of FIG. 6A, or in the selector/encoder 101 and 102 of FIGS. 7 and 8, or in the distributor 60, 61 and 200 of FIGS. 10, 11 and 15, not all the connection possibilities are illustrated in FIGS. 7~9, but the shown block diagrams will suffice to fully disclose the many interconnection possibilities.

The many power feeding possibilities to the selector/encoder 100 are explained above in connection with the power feed to the speakers or the power link or feed to the whole system, i.e., via the selector/encoder 100, or via the audio distributor 60, or via the home automation distributor 55, or via both distributors 55 and 60, with power fed via the encoded stereo line 6A, or via a separate power line link 6G, or direct power feed from a power supply linking the selector/encoder 100 via its power connector 17.

FIG. 7 shows the selector/encoder 101 with the power directly fed by the power supply 56 (not shown) via the power connector 17, or linked to the power supply 56 via one or both distributors 55 and 60 and via the twisted pair line 6G of FIG. 1C. When the power is fed via the line 6G the connector 17 is not used and is unnecessary. When the power is fed directly by the power supply 56 to the connector 17, the line 6G becomes a link line feeding to the speaker assemblies 92, 290 and 299 shown in FIGS. 5B, 6A and 6B.

The power fed directly to connector 17 or via the line 6G is regulated and controlled by the DC power control and regulate circuit 34 of the speakers assemblies of FIGS. 5B, 6A and 6B and the power regulate circuit 34A of the selector/encoder 101 of FIG. 7. While both regulators 34 and 34A provide regulated voltage VCC, the difference between the two regulators is the voltage and current control line VDD needed for the speaker assemblies and provided by the regulator and control circuit 34, while the regulator 34A of the selector/encoder 101 of FIG. 7 outputs the regulated VCC only.

FIG. 8 shows the selector/encoder 102 that its power is fed by the power supply 56 through one or both distributors 55 and 60 via the encoded line 6A to the DC separator circuit 35, which is a circuit comprising coils, capacitors and filters that are also used by the circuit 71 of the speakers 90 and 91 of FIGS. 4A and 5A respectively and explained above. The separated DC is fed to the current control and DC power regulate circuit 34B that regulates the VCC needed for the operation of the selector/encoder 102 of FIG. 8.

As explained above the current consumption of the selector/encoder 102 is low and therefore the current fed to selector/encoder 102 is a constant fixed current, controlled by the current control circuit 34B that includes a controlled shunt circuit to adjust a residual current fluctuation of about 10%, that is calculated to ensure variations in current drain because of temperature, component tolerances and other minor variants. The low current drain by the selector/encoder makes it simple to feed DC current along with the propagation of the encoded stereo signal and the multiplexed serial or the microphone signals via the twisted pair line 6A between the selector/encoder 100 and the audio distributor 60 without limitations.

FIG. 9 on the other hand shows the selector/encoder 103 that includes DC feed by the power supply 56 through the connector 17 of the selector/encoder 103, via the power control and regulate 34C and the DC injector or inserter 35A that injects the DC power to the encoded stereo line 6A for powering the speaker assembly 90 of FIG. 4A, shown in FIGS. 1A and 1B and explained above. The current fed to the speaker does fluctuate and it is necessary to limit the current that is fed to the speakers via the encoded line 6A. The current is controlled by a well known constant current regulator portion of the power control and regulate circuit 34C.

Except the power supply link and the intercom signals propagation variations all other circuits of the selector/encoders 101~103 are same. The selector 22 is a well known analog multiplexer or digital switch or a matrix selector for connecting any of the IN-1~IN-n and IN-M to any of the outputs 19, shown as OUT-1 and OUT-2. Each of the five shown inputs 18 are stereo L-R inputs for connecting any well known music player such as MP3, CD, ipod, DVD, Blue-ray and any other music player, or other audio sources including radio and television sets or set-top boxes, cable and/or satellite converters for the television. Even though only five stereo inputs are shown any number of inputs can be incorporated into the selector 22. The shown input IN-M is a monaural input for the intercom speaker signal. The two shown outputs 19, OUT-1 for connecting a selected input to other well known audio amplifiers or preamplifier and OUT-2 is for feeding the selected input to the stereo encoder 29. Even though two only outputs are shown the selector can incorporate any number of outputs.

The selector is operated by a command fed from the CPU 24 to connect one selected input to all the outputs, or a given input to a given output, in accordance to a command fed to the selector/encoders 101 ~103 via the operate and select keys 11~13A, the IR remote control unit 48 via the IR photo transistor or pin diode 25 and the IR RX 26, or other types of remote control units and/or via the serial command network, shared by the video interphone 50 and the home automation control system, propagated via the serial line 6D and the serial driver 28 to the CPU 24.

Alternatively the serial command can be extracted from the multiplexed encoded stereo line 6A by the differential receiver extractor 32 and fed to the CPU 24 via the ASK decoder 33. The CPU also commands the stereo modulator 29 to switch on and output stereo encoded signal to the differential twist pair driver 31. The stereo encoder is a well known encoder IC, available in different packages, including a single package IC for feeding the encoded signal to an FM radio transmitter, such as the well known model NJM2035 by JRC, or BH1415 by ROHM and many other stereo encoder ICs. When a digital stereo signal is propagated a digital stereo encoder is used instead, for example the well known IC MC44C401L by Free Scale or other ICs that are widely available.

Some digital stereo encoders and decoders are a programmed DSP device that can propagate multi audio channels and data signals including the two way intercom speaker and microphone signals between the encoder and the decoder. Such DSP device renders the differential receiver 32 and the ASK decoder 33 unnecessary and not used.

The CPU 24 feeds serial command for remotely operating each of the playback devices and/or the music sources individually, via the connector 20-1~20-n. The commands generated via the operate and select keys 11~13A or the IR remote control 48, or via the home automation control network and the video interphone 50 are fed from the CPU 24, on the basis of a lookup table stored into a memory of the CPU 24, to the playback devices or the music sources that are provided with such serial command input connectors (not shown). The CPU 24 will respond and operate all of the functions and features of the audio system on the basis of the commands it receives, or transfer via the serial driver 28, line 6D and/or via the differential twist pair driver 31 and line 6A commands for operating home automation appliances.

FIG. 7 shows the two buffer circuits, the intercom speaker buffer 38 and the microphone buffer 37 explained above, as being necessary to match the signal levels and line impedances. The two buffers are needed when the selector/encoder 101 is connected, via the wall socket 9, directly to the speaker 90 shown in FIG. 1B that shows the video interphone or intercom is also connected to the wall socket 9.

As the speaker 90 is connected via a single twisted pair 6A, it is impossible to feed the intercom speaker signal to the speaker directly, and for this reason the speaker signal is fed to the selector/encoder 100 through the wall socket 9 via a speaker twist pair line 6C of the CAT 5 cable 6 and via an RJ45 pin to the input of the intercom speaker buffer 38 shown in FIG. 7. The speaker buffer 38 matches the signal level and the impedance to feed, when the intercom is active, the intercom speaker signal to the input IN-M of the selector 22 for connecting the monaural speaker signal to the encoder 29, operating in monaural mode, and to the differential driver 31 for feeding the encoded monaural signal via the line 6A to the speaker 90.

The microphone signal is fed in reverse direction from the speaker 90 multiplexed over the twisted pair line 6A through the wall socket 9, the CAT 5 cable 6 and the RJ45 connector 21 to the differential receiver 32 that feeds the received FM modulator microphone signal to the FM demodulator 36 for outputting demodulated microphone signal to the microphone buffer amplifier 37 for outputting a matching microphone signal level and line impedance to the microphone input of the intercom circuit via a twisted pair line 6B of the CAT 5 cable and the wall socket 9.

FIG. 8 shows the selector/encoder 102 that includes only the intercom speaker buffer 38 but not the microphone buffer 37. This is because the microphone signal is routed via a buffer amplifier 37, included in the audio distributor 91 of FIG. 11, directly to the intercom circuit via terminal 56 shown in FIG. 2.

The intercom speaker signal is routed via the selector/encoder 100 as shown in FIG. 11, wherein the speaker line is connected via terminal 57 to the RJ45 connector 21 for feeding the signal directly via line 6C to the selector/encoder 102 of FIG. 8 via the wall socket 9 and CAT 5 cable 6 as shown in FIG. 2.

FIG. 9 shows the selector/encoder 103 incorporating no buffer circuit for the intercom. The selector/encoder 103 provides only for connecting a buffered intercom speaker signal fed via the twisted pair line 6C. For example, such speaker buffered signal is fed from the combined home automation and audio distributor 200 of FIG. 15 to the wall socket 9 via the twisted pair line 6C of a CAT 5 cable 6 and shown in FIG. 3, accordingly the selector 22 can connect the speaker signal to the encoder 29 as explained above.

Because no microphone signal is fed to the selector/encoders 102 and 103 of FIGS. 8 and 9, the FM demodulator 36, the microphone buffer amplifier 37 and the connecting pin of the RJ45 21 for the microphone line 6B shown in FIG. 7 are not included in the block diagram of the selector/encoders 102 and 103 of FIGS. 8 and 9. As explained above different interconnections between the intercom circuit and the audio systems are possible, and it is clear from FIGS. 7, 8 and 9 that the microphone signal and the speaker signal to and from the video interphone or intercom can be buffered and propagated to and from the audio system, be it through the selector/encoder 100, 101, 102 or 103 or via the audio distributors as will be explained below.

The selector/encoders 101, 102 and 103, all are shown to include differential receiver 32 and ASK decoder 33 for extracting and decoding the serial command signals fed via the multiplexed encoded line 6A for feeding the serial command to the CPU 24. Similarly the CPU 24 is shown to feed serial command signal to the differential twist pair driver 31 for multiplexing and propagating serial commands to the distributors 55 and 60~63 via the encoded line 6A.

The pins 6D of the connector 21 that can be connected to a serial command signal propagated two way are a serial command port, also known as I/O port. FIGS. 7, 8 and 9 also show that all the selector/encoders 101, 102 and 103 respectively include serial driver in-out 28, which feeds two way serial commands via the twisted pair line 6D. This dual signal propagation enables flexibility in system configurations and a selection of one rout or the other for propagating the serial commands signals but it is not a must.

From all the above it is clear that the selector/encoder 100, 101, 102 and 103 may comprise other variations and modifications of the different circuits and that different connections can be implemented to set up of an audio system that feeds the stereo sound to a pair of speakers via a cascading single twisted pair carrying encoded stereo signal and other multiplexed signals and that the audio system can be operated by an IR or other remote control devices and/or via serial command propagated by the home automation system.

It is also clear that an expanded audio system comprising the referenced selector/encoders can be integrated and connected with the video interphone or intercom system and/or with the home automation system using cascading twisted pairs of a CAT 5 or other cables.

FIG. 10 shows the audio distributor 60 that is shown in FIGS. 1D~1F and FIG. 2 propagating encoded stereo signals to n speakers 90 and 99, including the propagation of the two way serial commands and with the power fed to the speakers via the encoded line 6A. The audio distributor 60 is further shown in FIGS. 1E, 1F and 2 to connect the microphone signal to the intercom 50 and the intercom speaker signal to the speakers 90.

As explained above for the selector/encoders 101, 102 and 103, the impedances and signal levels of the intercom circuits and the audio system circuits need to be matched. For this two buffer circuits, the speaker buffer 38 and the microphone buffer 37 are shown in FIG. 7, but not in FIG. 9. The reason for not using buffer circuits with the selector/encoder 103 of FIG. 9 is the introduction of the same buffer circuits in the audio distributor 60 shown in FIG. 10, which propagates the microphone and the intercom speaker signals directly between the intercom circuits of the video interphone 50 via terminals 57 and 58 of the distributor 60 and to the speakers 90 of the audio system via line 6A shown also in FIG. 2. In such a setup the selector/encoder 101 function is only to mute or cut the music and switch over the mode to monaural when the intercom is activated.

FIG. 11 shows the audio distributor 61 that includes microphone buffer 37 but not the intercom speaker buffer 38. The microphone buffered signal is fed directly to the microphone terminal (not shown) of the video interphone 50 via the terminal 56 of the distributor 61. The intercom speaker signal however is fed through the RJ45 connector 21 via the twisted pair line 6C, feeding the non buffered speaker signal to the input of the speaker buffer circuit 38 of the selector/encoder 102 shown in FIG. 8 via the corresponding connector RJ45 of the selector/encoder 102.

The microphone signals from the speakers 90 or 91 of FIGS. 4A and 5A are fed from the terminals of the differential line connecting the twist pair receivers and drivers 42-1~42-n via the signal separator and DC injectors or inserters 35B-1~35B-n to a differential switch 40 for selecting the speaker channel that is engaged with the intercom when its microphone circuit is activated. The differential switch 40 is a well known selector, such as the well known analog multiplexer switch or the well known digital switch for connecting any of the two way ports shown in FIGS. 10 and 11 as 1A/1B~nA/nB to the two way ports 1C/1D~2C/2D. The differential switch 40 is operated and controlled by the CPU 41 to propagate the operating and active microphone FM modulated signal to a microphone signal extractor comprising the differential receiver 32, the FM demodulator 36 and the buffer 37. The FM demodulator 36 feeds the demodulated microphone signal to the buffer amplifier 37 for feeding a buffered microphone signal to the microphone terminal 56 and to a microphone connection pin of the RJ45 connector 21.

The intercom speaker signal is shown in FIG. 10 fed through the terminal 57 to the speaker buffer amplifier 38 that feeds the speaker buffered signal to the differential driver 31. The differential driver 31 injects a differential speaker signal through the differential switch 40 into the differential line, connecting the selected and engaged speaker channel with the intercom 50, i.e., the channel that its microphone signal is fed in the opposite direction. By this it becomes clear that the two way communications between a selected speaker channel and the intercom circuit of the shown video interphone 50 of the present invention is well implemented.

As explained above the stereo encoder 29 is commanded to mute, for example the left speaker and switch over to monaural mode, enabling to inject a monaural speaker sound, having frequency range of between 50 Hz and 5 KHz to the differential signal line that is fed to the stereo decoder 67 for feeding the speaker signal to the speaker amplifier 68 commanded to amplify as per the example, the right speaker signal only. The FM modulated microphone signals having 200 KHz carrier frequency, is well separated from the audio frequency allocated to the encoded stereo 30 Hz~90 KHz band, and thus, the speaker and microphone signals cannot and do not interfere with each other, moreover the CPU 41 of all the referenced speakers, control the hands free circuit 76 such that the acoustic feedback is minimized, and the signals will be propagated alternately. It becomes obvious that the intercom communication through the audio system via the encoded line 6A of the preferred embodiment makes the hands free communication with the video interphone or intercom 50 convenient and flawless.

FIG. 10 shows that the power is fed to the audio distributor 60 via the power terminal or connector 51 that is also connected to the pins 6G of the RJ45 connector 21, for connecting the power via the twisted pair line 6G to the selector/encoder 101 of FIG. 7. The power is fed to the power control and regulate 34 of the audio distributor 60 for providing a regulated VCC voltage source to the distributor circuits and controlled current for injecting the power to the speakers 90 and 91 of FIGS. 4A and 5A via the stereo encoded lines 6A that are connected to the speaker terminals 1-1~1-n.

The DC current is injected to the encoded stereo line via signal separator and DC injector circuits 35B-1~35B-n. The circuit similar to the other DC inject or insert circuits explained above include coils, filters and capacitor to allow the two way signals to and from the speaker assemblies 90 and 91 to pass and remove all the signals from the power feed terminals. By this the two way communication including the encoded stereo signal fed from any of the referenced selector/encoders including the multiplexed serial signals and/or the FM modulated microphone signals, such as in the system shown in FIG. 1B, can be propagated with no disturbance, along with the DC current fed to speakers 90 or 91, all via the twisted pair line 6A.

The differential receiver and buffer 42-1~42-n are explained above and are disclosed in the referenced U.S. Pat. No. 5,923,363 are all fed with the encoded stereo signals from any of the receiver/encoders 100, 101, 102 and 103 but only the addressed driver or drivers will operate as commanded by the CPU 41. As shown in FIGS. 10~15 all the referenced distributors 60, 61, 62, 63, 64 and 200 include the circuits 44-1~44-n for setting the room or zone address for each stereo channel and include an extract and inject circuits to and from the serial command signals, propagated via the encoded line 6A and/or via the serial command line, including the serial command of the home automation connected to any of the audio distributors via the terminals 53 shown in FIGS. 10~14.

The serial command signals propagated to and from the home automation distributor 55 shown in FIG. 2 are exchanged through the serial driver in/out 28 via the serial command ports 53 and line 6D shown in all the referenced audio distributors of FIGS. 10~15 that feeds and receive the serial commands to and from the CPU 41 and to and from the selector/encoder 100, 101, 102 and 103 via the respective serial command ports and the serial command signal line 6D.

The circuits 44-1~44-n ensure that only the differential driver or drivers 42-1~42-n having a corresponding addressed room or zone as set will receive a command, such as to feed the encoded signal or the intercom speaker signal and/or a serial commands to pass. The serial signals however fed from the speakers will be extracted from the driver 42 by the extract circuit of the circuits 44-1~44-n and fed to the CPU 41 to act upon, or be propagated from the CPU 41 via the serial driver 28 to the home automation distributor 55 or to the selector/encoder 100~103.

FIG. 11 shows a modified audio distributor 61 in which the intercom speaker signal is not processed, but only fed through the terminal 57 to the RJ45 connector for transferring the intercom speaker signal via the twisted pair line 6C to the input of the speaker buffer 38 of the selector/encoder 101 shown in FIG. 7. Another difference is in the powering of the audio distributor 61, shown to be directly linked to a power supply 56 (not shown) via terminal 51. The power is fed to the power control and regulate 34 that provide VCC for the distributor circuits and separate power distribution to the speakers 92 of FIG. 5B via the connectors 3-1~3-n. Outside the connection to the power supply 56, direct or through the home automation distributor 55, the power feed to the speaker 92 and the transfer of the intercom signal to the selector/encoder 101, all the remaining circuits function and operate the same way as explained above for the audio distributor 60.

Figure 12:
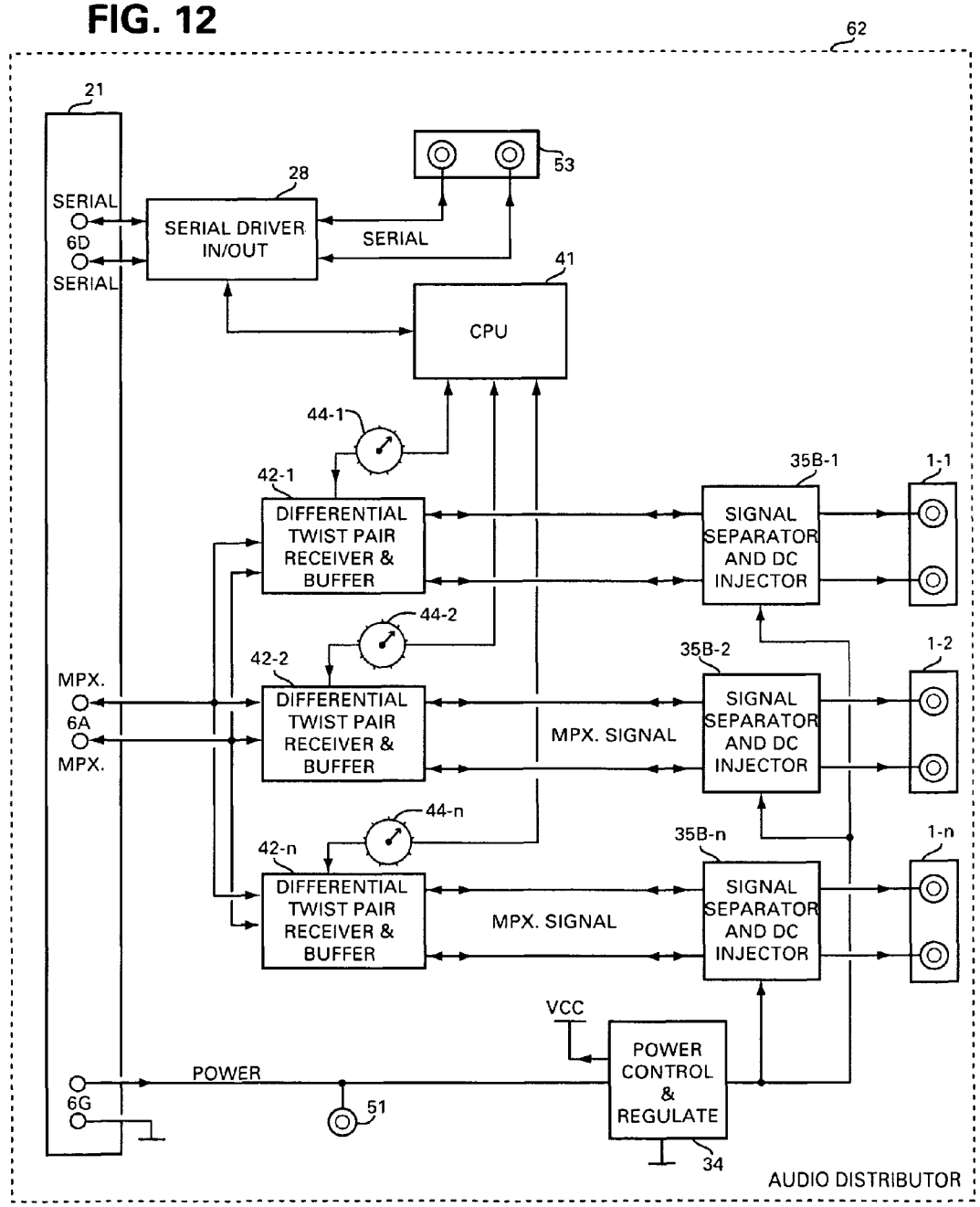
FIG. 12 is a block diagram of the basic audio distributor of the preferred embodiment for distributing encoded stereo signals including power feed to the speakers via the stereo encoded line.

The distributor 62 of FIG. 12 is a modified version of the distributor 60 of FIG. 10. It does not include the intercom interconnections, the intercom communication integration circuits and the microphone—speaker selector 40. Otherwise the audio distributor 62 is identical with the audio distributor 60 for propagating the encoded stereo signals to the speakers 90 and 91 including power via the twist pair line 6A. Similarly the audio distributor 62 can be connected to the home automation distributor 55 and communicate with the two way serial command signals with the home automation system propagated via the serial line 6D and the serial command ports or connector 53, or with the selector/encoder 101 via the encoded line 6A and/or via the serial command line and ports 6D.

Figure 13:
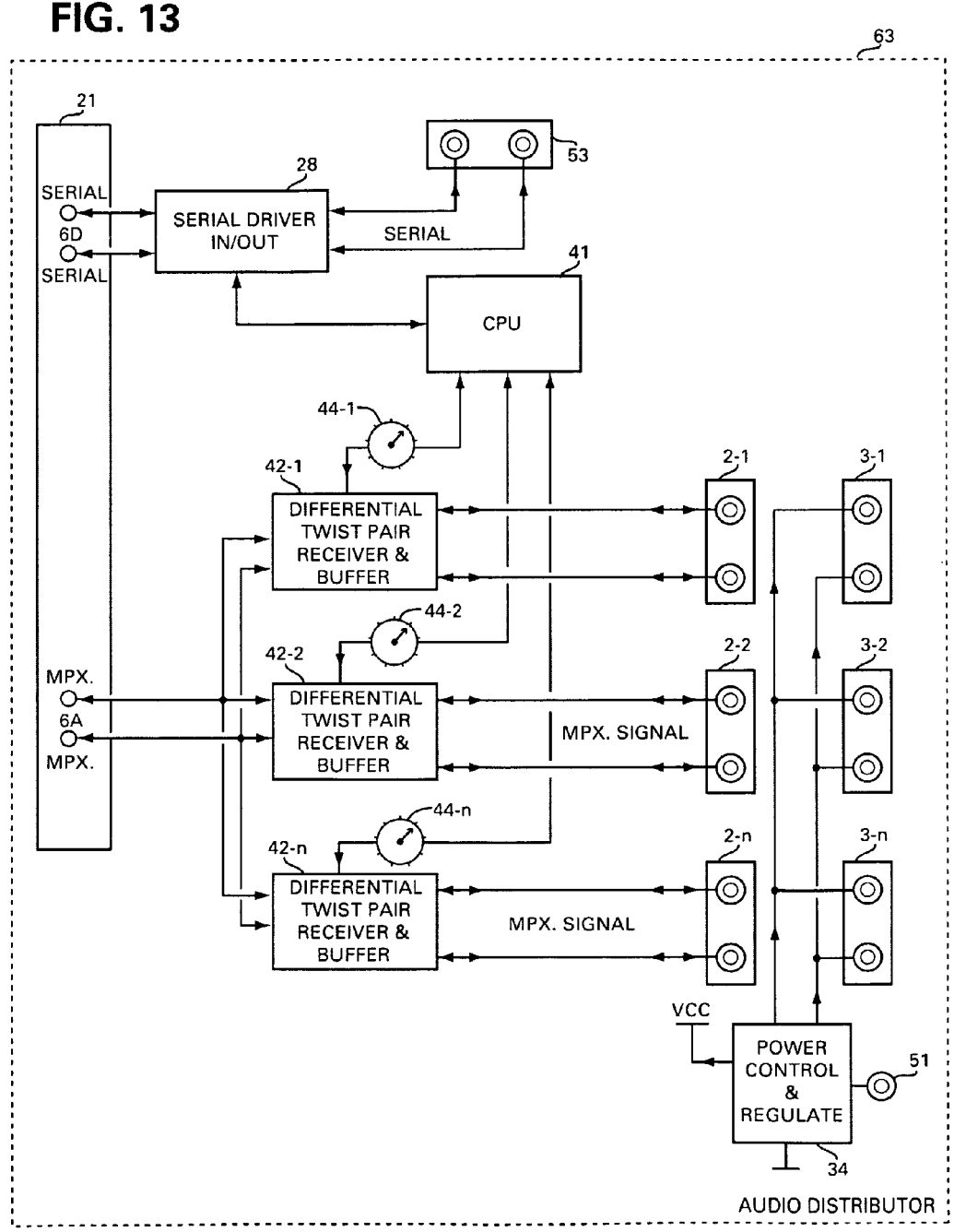
FIG. 13 is a modified block diagram of the audio distributor of FIG. 12 for distributing encoded stereo signals to the speakers of FIG. 5B with power feed via a separate power line.

The audio distributor 63 of FIG. 13 is a modified version of the audio distributor 61 of FIG. 10. It does not include the microphone processing circuits, the interconnection to the interphone speaker and microphone lines and the microphone/speaker selector 22. Otherwise it is similar to the audio distributor 61, having direct power feed method to the speakers 92 via the power connectors 3-1~3-n. The distributor 63, similar to the distributor 61 can be integrated with the home automation distributor 55 for power feed and for exchanging the serial commands between the audio system and the home automation system via the serial line and port 6D, or between the distributor 63 and the selector/encoder 103 via the encoded line 6A. The distribution of the encoded stereo signal to the speaker 92 and the control of the audio system and of the audio distributor 63 is the same as explained above for the distributor 60, except the controlling of the intercom system that is not included in the distributor 63.

FIG. 14 shows an audio distributor 64 that combines n amplifiers 65 for feeding amplified stereo signals to n speakers 99 shown in FIG. 4B. The distributor 64 receives the encoded stereo signals via a differential receiver and injector or inserter 32, feeds the encoded signal to a stereo decoder 67, that is the same or similar to the decoder used by the speakers 4A, 5A, 5B and 6A, for feeding Left/Right stereo signals to the n stereo amplifiers 65. The stereo output signals are fed via the connectors 4-1L/4-1R~4-nL/4-nR and a twisted pair line 6F to the speakers 99 shown in FIG. 4B. As the speaker assembly shown in FIG. 4B contain only the speaker itself with the connector 4, and no other circuitry, microphone and IR receivers/IR transmitters, many of the circuits used in the other referenced distributors, such as DC injector, two way signal separators and/or multiple differential receivers and buffers become unnecessary and are not used.

The power to the audio distributor 64 is connected directly from a power supply 56, or via the home automation distributor 55 to the connector 51 shown in FIG. 14, or via the twisted pair line 6G and the RJ45 connector 21. The two way serial command signals can be propagated between the audio distributor 64 and the selector/encoder 101 via the serial command line 6D or via the encoded line 6A, both through the RJ45 connector 21. The serial command signals integrating the audio system and the home automation system are connected to both distributors 55 and 64 and are fed via the serial command terminals or ports 53 and exchanged through the driver 28. Otherwise the other circuits, including the CPU 41 and the stereo amplifiers 65 are all explained above.

It is clear from the above explanation that the audio distributor 64 can distribute the amplified stereo signal to the speakers 99 shown in FIG. 4B via the twisted pairs 6F, a single twisted pair for connecting each speaker and use a single twisted pair to feed the encoded stereo signal multiplexed with serial commands, and using the serial commands for controlling the music fed to the speakers pairs from the keys of the selector/encoder 103, via an IR remote control 48 and/or via the home automation system.

Shown in FIG. 3 is the interconnecting method and apparatus of the audio system of the present invention, using CAT 5 cables 6 or other standard cables and RJ45 connectors or other standard connector throughout explained above. Because such interconnections using multiple twisted pairs of a given cable, such as the CAT 5 cable 6, having four twisted pairs as standard for PC networking, the need for multiplexing the different signals into a combined signal for propagation the multiplexed signal over a single twisted pair is not required, as it is possible to propagate the signals individually via the multiple twisted pairs. By this, the signal inject, extract and/or DC inject circuit become unnecessary and are not included in the distributor or the speakers structured for multiple twisted pair connection which may compensate both, the material cost and labor versus the cost of the fitted multiple connectors.

The distributor 200 of FIG. 15, the left speaker 290 of FIG. 6A and the right speaker 299 of FIG. 6B are combined into a system shown in FIG. 3, interconnected via CAT5 cable 6 and RJ45 connectors 21 throughout. The reference here to the left-right speakers is again, for convenience only and can be reversed, wherein left can be read as right or A speaker and right can be read as left or B speaker.

FIG. 6A shows the speaker assembly 290 that uses two RJ45 connectors, 201 is for connecting the left speaker 290 to the combined distributor 200 of FIG. 15, using CAT 5 cable 6. Connector 202 is for connecting the left speaker assembly 290 with the right speaker assembly 299 shown in FIG. 6B via same CAT5 cable 6 and RJ45 connectors. The multiplex signal receiver, extractor or separator and injector or inserter 32, is the same circuit used in the audio distributor 64 shown in FIG. 14, for receiving encoded stereo signal multiplexed with two way serial signals, but without the multiplexing input for the FM modulated microphone signal of the circuit 32A shown in the speaker assembly 92 of FIG. 5B. This is because the microphone signal of the speaker 290 is not injected into the encoded line 6A. The microphone signal fed from the hands free microphone amplifier and buffer 76B to the combined distributor 200 is a buffered microphone signal fed via a twisted pair line 6B of the CAT 5 cable 6, fitted with RJ45 connectors 201.

Outside the above described microphone circuit 76B and the above connectors 201, 202 and the addition of the serial driver 28 and the serial signal connections, the speaker 290 is similar to the speaker 92 shown in FIG. 5B with its circuit and operation explained above.

The addition of the serial driver 28 is to provide for exchanging serial commands with the IR RX 26R and IR TX 26T included in the speaker assembly 299 for expanding the IR transmitters 25T-1~25T-n and IR receivers 25R-1~25R-n coverage area in the room or zone they are installed. The power to the speaker assembly 290 is fed via the twisted pair 6G of the CAT 5 cable 6 via the RJ45 connector 201. The power is fed to the control and regulator 34, same as the power regulator of the speaker assembly 92. The terminals 6G of the RJ45 connector 202 are for extending the power line to feed the speaker assembly 299. The speaker 299 of FIG. 6B is similar speaker to the speaker shown in FIG. 4A, with the exception of the RJ45 connector 202 that uses 2 pins to connect the line 6F to the speaker. The other differences between the speakers 99 and 299 are the IR circuits and the serial driver 28 explained above. The addition of IR circuits to the speaker assembly 299 is to provide wider coverage of the IR remote control network of the home automation and the audio system.

FIG. 15 shows the combined distributor 200 that provides for interconnecting the audio system of the present invention via a CAT 5 cable and RJ45 connectors and/or other standard or custom cables and/or other standard or custom connectors.

The combined distributor 255 includes the home automation circuit incorporated herein by the referenced home automation patent applications Ser. Nos. 11/874,309; 11/939,785 and 12/236,656 and shown as a circuit block 255 for feeding RJ45 connectors 8-1~8-n, each with four lines of twisted pair 8A~8D carrying two way serial commands, with or without power feed, to the home automation individual control circuits (not shown). The home automation circuit block 255 is powered by the power fed to the combined distributor 200 and communicates with the other elements of the combined distributor via the serial command line 6D connecting the circuit block 255 with and through the serial driver 28 for communicating with the CPU 41 and all the devices of the audio system.

The combined distributor 200 includes a USB RJ45 connector 58, which is replacing the same connector 58 of the home automation distributor 55, an RJ45 wall socket connector 21 replacing the same connector 21 of the audio distributor 60, an RJ45 video interphone or intercom connector 7 for interconnecting the video interphone or intercom 50, using CAT 5 cable fitted with RJ45 connector, and n number of RJ45 speaker connectors 201-1~201-n for connecting n speaker assemblies 290, explained above.

The USB connector 58 feeds the same multiplexed signals generated by the video interphone 50 to the home automation distributor 55, and as explained above, for propagating the multiplexed signal via a twisted pair line 6E, the two way serial signal via line 6D and VCC power feed via line 6G to the USB converter 80 shown in FIG. 3, replacing the connector 58 of the home automation distributor 55, for interconnecting the USB converter 80 with the combined distributor 200 via a CAT 5 cable 6 fitted with RJ45 connector 58 shown in FIG. 3.

The wall socket connector 21 feeds intercom speaker signal, buffered by the speaker buffer amplifier 38 of the combined distributor 200 for feeding the speaker signal via line 6C to a modified selector/encoder 100. The modified selector/encoder 100 does not include the speaker buffer circuit 38, the microphone processing circuits 36 and the buffer 37 shown in FIG. 7. The other signals fed via the wall socket 21 include the serial command signal via line 6D and the encoded stereo signal multiplexed with serial commands signals via the line 6A, same as explained above in connection with the audio distributors 60~64. The wall socket 9 is shown in FIG. 3 extended between the combined distributor 200 and the selector/encoder 100. The forth twisted pair of the wall socket 9 feeds the power to the selector/encoder 100 via line 6G. By this the wall socket connector 21 provides for connecting the combined distributor 200 with the selector/encoder 100 as shown in FIG. 3, including the interconnection for feeding the speaker signal of the intercom 50 to the modified selector/encoder 100.

The video interphone connector 7 transfers the speaker signal fed from the intercom circuit 50 via the twisted pair line 6C to the input of the speaker buffer amplifier 38, which feeds its buffered output to the wall socket, explained above. The video interphone connector 7 feeds also the video, audio, control, alarm and data multiplexed signals via the twisted pair line 6E to the USB connector 58, also explained above. The connector 7 connects to the microphone driver output terminal amplifier 37 for propagating the buffered microphone signal to the intercom circuit 50 via the twisted pair line 6B. The last connected line 6D of the connector 7 is to exchange serial commands between the combined distributor 200 and the video interphone 50, thereby providing for all the connections between the video interphone 50 and the combined distributor 200, using CAT 5 cable and standard RJ45 connectors 7.

Each of the RJ45 connectors 201-1~201-n propagate to a speaker assembly 290 the encoded stereo signal multiplexed with serial commands via line 6A, and via the line 6G it links or feeds the power to the speakers. The line 6B propagates in reverse direction the buffered microphone signals to the inputs of the selector 40M, that is similar to the selector 40 of FIGS. 7 and 8, but provides for connecting only microphone signal to one output terminal. The output terminal of the selector 40M feed the selected microphone signal to the buffer amplifier 37 explained above, that matches the impedance and the microphone signal level with the impedance and signal levels of the video interphone or intercom 50. All the speaker connectors 201 are connected to the serial command line 6D for exchanging commands between the speakers and the combined distributor 200 and are distributed by the distributor 200 to all other devices of the audio system and the home automation system as shown in FIG. 3.

The other circuits of the combined distributor 200 are explained above in connection with the audio distributors. FIG. 15 shows two serial drivers 28 for propagating the serial commands to the audio system and the home automation/intercom system, and exchanged between the two systems via the CPU 41. The power control and regulator 34 is the same as the power control and regulator 34 of the audio distributor 61, for powering the circuits of the combined distributor 200 and for extending the power line or link 6G to the speakers 290 via the connector 201-1~201-n, to the selector/encoder 100 via the wall socket 21 and for feeding power to home automation distributor circuit block 255.

The differential twist pair receiver and buffer 42-1~42-n are the same circuits shown in the audio distributors 60, 61, 62 and 63 and explained above, used for feeding encoded stereo signals, multiplexed with serial commands to the speakers 290 via line 6A. The return serial commands can be propagated via the same line 6A, but as the speaker 290 and 299 are connected via the serial command line 6D to the serial driver 28, the two way commands of the combined system shown in FIG. 3 is based on serial command communication exchanges via the lines 6D, including the IR control commands exchanged and operated via the IR receivers and IR transmitters of the speakers 290 and 299.

From the above and FIGS. 3, 6A, 6B and 15, it is clear that the combined system using the distributor 200 and the speakers 290 and 299 of the audio system of the present invention can be integrated with the home automation system and with the video interphone or intercom system, using simple and efficient interconnections via cascading CAT 5 cables fitted with RJ45 connectors, or other cables and connectors. It is also clear that the propagated stereo sound signal is an encoded stereo signal fed through the combined distributor 200 to the speakers 299 via a single twist pair 6A of the CAT 5 cables.

It is also clear that the selector/encoder 100 or 103 can be connected to the speakers 290 and 299 in a cascaded network interconnections or segments using the CAT 5 cable 6 fitted with RJ45 connectors, replacing the speakers 90 and 99 and the speakers interconnecting twisted pairs 6A and 6F shown in FIGS. 1A and 1B.

The microphone and its associated circuits may not be necessary and not used when no intercom is integrated with the audio system, similarly if the audio system is a stand alone system, the IR receivers and transmitters with all their associated circuits may not be necessary and not used. Any other circuit shown that may be unnecessary in a given setup may not be used for that given system.

In the examples explained in the summary of the invention above, it was mentioned that it is possible to provide both the left and the right speaker assemblies with single channel amplifier, the example is not shown, but it should be clear that such setup is achieved by connecting the two speakers in a cascaded line 6A, for feeding the same encoded stereo signal to both speakers, such as two speaker assemblies 5B having correct termination for the double connected line 6A, and commanding or programming one of the speaker's CPU 41 to play only left channel and the other CPU 41 to play only the right channel. For such speakers, the connector 4 is unnecessary and not used, while the speaker amplifier 68 maybe changed to a single channel output amplifier.

Another modification to the shown examples of interconnections is the introduction of the audio amplifier 68 along with all the circuits shown in the speaker assemblies 4A, 5A, 5B or 6A into an IR driver assembly disclosed in the U.S. patent application Ser. No. 11/939,785 for connecting two speakers shown in FIG. 4B or 6B via wall sockets, such as wall socket 9, for placing the two speaker assemblies 99 at the tenant desired position.

Though the repeated references to the well known wall socket and the illustrated wall socket 9 are to an RJ45 connector, such as commonly used for network connections, any type of well known or custom connectors and wall sockets can be used instead. The term wall socket includes pigtails with or without connectors, interconnecting junction boxes, junction boards, or junction strips and other interconnection devices such as terminal blocks and similar.

The selector/encoders 100, 101, 102 and 103 are referenced above and illustrated as a combined unit however, the selector and the encoder can be divided and operated independently and be interconnected by an added cascading fitted network cable, by using for example two twisted pairs for outputting from a select or unit the left-right stereo signals to an encoder unit. One of the remaining two twisted pairs can be used for serial command signals and the other for the power line feed.

From all the above explanations it should be clear that many different interconnections and different circuits for the speaker assemblies, the selector/encoder and the distributors can be structured and/or configured or that the shown circuits can be modified in many forms, and be integrated in different setups, and not all possibilities for such modifications, changes and setups are disclosed.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for combining a selector/encoder with one of a single pair of A and B speakers and at least one of said pair of A and B speakers via a sound distributor into a sound distribution system of an home automation by propagating an encoded stereo signal to said A speaker via one of a single segment and a cascading segments of an interconnection cable selected from a group comprising at least one twisted pair, a multi twisted pair cable, a fitted multi twisted pair cable and combinations thereof, wherein at least one segment of said cascading segments is intersected by a wall socket selected from a group comprising a connector, a pigtail, a fitted pigtail, a junction box, a junction board, a junction strip, a terminal block and combinations thereof;

each of said A speaker includes a decoding unit for decoding said stereo signal, a stereo amplifier for amplifying the decoded signal and feeding amplified stereo signal to said A and B speakers and a CPU for exchanging serial signals via one of multiplexed into said encoded stereo signal and through a third twisted pair of said interconnection cable with one of said selector/encoder direct and with said selector/encoder via said distributor, said method comprising the steps of:

a. interconnecting said selector/encoder with said A speaker by one of directly via said single segment and through said sound distributor via said cascading segments for feeding said encoded stereo signal to said decoder;

b. connecting said selector/encoder to a power supply for powering said sound distribution system including said A speaker by a feed selected from a group comprising a constant current via said one twisted pair, a DC power via a second twisted pair of said interconnection cable, said constant current via said one twisted pair cascading through said sound distributor, and said DC power via said second twisted pair cascading through said sound distributor;

c. interconnecting a twisted pair of a subsequent segment cable cascading between said A and B speakers for feeding B channel of said amplified stereo signals to said B speaker;

d. connecting a stereo cable between an input terminals of said selector/encoder and an output terminals of at least one music signal source;

e. exchanging said serial signals between said selector/encoder and said CPU via one of said third twisted pair and said multiplexed via said one twisted pair;

f. operating said sound distribution system via touch keys of said selector/encoder or via a remote control unit associated with said selector/encoder.

2. The method for combining sound distribution system according to claim 1, wherein a rechargeable battery is associated with said A speaker to provide for higher current drain by said amplifier for increasing the sound power output, and wherein one of said feeding a constant current to said decoding unit includes a current for charging said battery and said DC power provides for charging said battery randomly.

3. The method for combining sound distribution system according to claim 1, wherein said segment intersected by said wall socket comprises said fitted multi twisted pair cable including said at least one twisted pair.

4. The method for combining sound distribution system according to claim 3, wherein said A speaker includes a microphone for propagating one of a microphone signal multiplexed with said encoded stereo signal via said one twisted pair and analog microphone signal via a forth twisted pair of said interconnection cable and at least one remote control receiver, one of said selector/encoder and said sound distributor feeds one of said analog microphone signal and a microphone signal extracted from said multiplexed signal to an intercom and buffers a speaker signal received from said intercom;

one of said wall socket and said sound distributor provides terminals and a control port for connecting at least three twisted pairs of said interconnection cable, one pair connecting an intercom speaker line to said selector/encoder, a second pair connecting a microphone line to said intercom and a third pair connecting a serial signal line of said intercom with said control port for exchanging control and operation commands for integrating said sound distribution system with said intercom, said method comprising the further steps of;

g. connecting said intercom speaker line, said microphone line and said serial signal line between said intercom and one of said wall socket and said sound distributor;

h. exchanging said serial signals for commanding said sound distribution system and said intercom to switch over to intercom mode, propagate a monaural sound of said intercom speaker signal, enable said microphone and open voice communication with said intercom;

i. controlling the communication with said intercom including the operation of other functions of said intercom via one of said touch keys, keys of said intercom or keys of said remote control unit.

5. The method for combining sound distribution system according to claim 1, wherein at least one of said A and B speakers includes at least one remote control receiver and at least one remote control transmitter for exchanging said serial signals including remote control signals via said interconnection cable connecting said A and B speakers with at least one of said selector/encoder and said sound distributor;

each said wall socket and said sound distributor includes a control port for exchanging said serial signals with a serial port of an home automation distributor for integrating said sound distribution system with said home automation system, said method comprising the further steps of;

g. connecting said serial port to said control port;

h. operating the integrated sound and said home automation by exchanging said serial signals between said home automation distributor, said sound distributor and said selector/encoder through a medium selected from a group comprising said selector/encoder, said sound distributor, said home automation distributor, said remote control unit, said A speaker, said B speaker, said serial port, said control port, a remote control driver included in said home automation system and combinations thereof.

6. The method for combining sound distribution system according to claim 5, wherein said control port of said sound distributor and said serial port of said home automation distributor and said serial signal line of said intercom are connected for integrating the controls of the three systems into one for operating said sound distribution, said intercom and said home automation through a medium selected from a group comprising said selector/encoder, said remote control unit, said A speaker, said B speaker, said serial signal, said serial port, said control port, said sound distributor, said home automation distributor, said intercom, a remote control driver included in said home automation system and combinations thereof.

7. The method for combining sound distribution system according to claim 4, wherein said intercom includes a combination port for propagating a combined multiplexed signals selected from a group comprising video, audio, data, command, control, alarm and combinations thereof generated by said intercom system, including said serial signals, said intercom speaker signal and said microphone signal exchanged through said sound distributor;

at least one of said home automation distributor and said sound distributor include a reciprocal port and an interface connector for propagating said combination of multiplexed signals to an interface unit selected from a group comprising a signal converter, a modem, ADSL, a PC, a PC server, a PC program, a USB converter, a network communicator, a router, a network switch and combinations thereof, said method comprising the further steps of;

j. connecting said combination port of said intercom with said reciprocal port of one of said home automation distributor and said sound distributor and said interface unit to said interface connector;

k. connecting said interface unit to a network selected from a group comprising a local area network, a wide area network, a public network, a dedicated network, the Internet and combinations thereof for propagating an interfaced signal adapted for communicating via said network for remotely operating said home automation and for communicating with said intercom and with an e-station selected from a group comprising e-emergency, e-medical, e-hospital, e-service, e-shopping and combinations thereof;

l. operating said sound distribution, said intercom, said home automation and said interface unit through a medium selected from a group comprising said selector/encoder, said remote control unit, said A speaker, said B speaker, said serial signal, said serial port, said control port, said remote control driver, said network, said Internet and combinations thereof.

8. The method for combining sound distribution system according to claim 7, wherein said remote control receiver and said remote control transmitter are selected from a group comprising IR, RF, wired and combinations thereof for exchanging data and signals generated by at least one emergency and medical devices associated with said intercom, said devices selected from a group comprising monitors, sensors, cameras, diagnosis, analysis, treatment, applicators, life support, rehabilitation and combinations thereof, for communicating with said e-station said data and signals outputted by said devices and for selectively operating said devices remotely.

9. The method for combining sound distribution system according to claim 7, wherein at least one of said distributor and said interface unit includes an extractor for extracting said video signal from said combined multiplexed signal for displaying an image onto a screen selected from a group comprising a television set, a video monitor, a tablet monitor, a PC display monitor, a set-top box, a cable box, an antenna box, a satellite box, a digital to analog converter box, an analog to digital converter box, a tuner box, a PC, a tablet controller, a video selector and combinations thereof, said method comprising the further steps of;
   m. connecting a video feed cable from one of said home automation distributor, said sound distributor, said selector/encoder and said interface unit to said screen;
   n. controlling said screen to display said image through a medium selected from a group comprising said selector/encoder, said remote control unit, said A speaker, said B speaker, said serial port, said control port, said remote control driver, said intercom and combinations thereof.

10. A method for combining sound distribution system according to claim 1, wherein said selector/encoder, said sound distributor and said A speaker propagate said encoded stereo signal via a first twisted pair, said DC power link via a second twisted pair and said serial signals are exchanged via a third twisted pair of a cascading fitted multi twisted pair cables, and wherein said selector/encoder, said sound distributor, said A speaker and said B speaker include matching connectors for said fitted multi twisted pair cables, and wherein said B speaker also connects to said A speaker via a cascaded segment of said fitted multi twisted pair cable.

11. An apparatus for combining a selector/encoder with one of a single pair of A and B speakers and at least one of said pair of A and B speakers via a sound distributor into a sound distribution system of an home automation by propagating an encoded stereo signal via one of a single segment and via a cascading segments of an interconnection cable selected from a group comprising at least one twisted pair, a multi twisted pair cable, a fitted multi twisted pair cable and combinations thereof, wherein at least one segment of said cascading segments is intersected by a wall socket selected from a group comprising a connector, a pigtail, a fitted pigtail, a junction box, a junction board, a junction strip, a terminal block and combinations thereof;
   each of said A speaker includes a decoding unit for decoding said stereo signal, a stereo amplifier for amplifying the decoded signal and feeding amplified stereo signal to said A and B speakers and a CPU for exchanging serial signals via one of multiplexed into said encoded stereo signal and through a third twisted pair of said interconnection cable with one of said selector/encoder direct and with said selector/encoder via said distributor;
   said selector/encoder connected to said A speaker via one of said single segment and through said sound distributor via said cascading segments feeds said encoded stereo signal to said decoder and exchanges said serial signals between said selector/encoder and said CPU via at least one of said third twisted pair and said multiplexed via said one twisted pair, and to a power supply for powering said sound distribution system including said A speaker by a power feed selected from a group comprising a constant current via said one twisted pair, a DC power via a second twisted pair of said interconnection cable, said constant current via said one twisted pair cascading through said sound distributor, and said DC power via said second twisted pair cascading through said sound distributor;
   said B speaker is connected by a twisted pair of a subsequent segment of said interconnection cable with said A speaker for inputting said amplified B channel signals, said selector/encoder is connected through at least one of its stereo input connectors to one of stereo and mono output connectors of at least one music signal source via a stereo cable and said sound distribution system is operated via touch keys of said selector/encoder or via a remote control unit associated with said selector/encoder.

12. The apparatus for combining sound distribution system according to claim 11, wherein a rechargeable battery is associated with said A speaker to provide for higher current drain by said amplifier for increasing the sound power output, and wherein one of said feeding a constant current to said decoding unit includes a current for charging said battery and said DC power provides for charging said battery randomly.

13. The apparatus for combining sound distribution system according to claim 11, wherein said segment intersected by said wall socket comprises said fitted multi twisted pair cable and wherein said fitted multi twisted pair cable comprising said at least one twisted pair.

14. The apparatus for combining sound distribution system according to claim 13, wherein said A speaker includes a microphone for propagating one of a microphone signal multiplexed with said encoded stereo signal via said one twisted pair and analog microphone signal via a forth twisted pair of said interconnection cable and at least one remote control receiver, wherein one of said selector/encoder and said sound distributor feeds one of said analog microphone signal and a microphone signal extracted from said multiplexed signal to an intercom and includes a buffer for a speaker signal of said intercom;
   one of said wall socket and said sound distributor provides terminals and a control port for connecting at least three twisted pairs of said interconnection cable, one pair connecting an intercom speaker line to said selector/encoder, a second pair connecting a microphone line to said intercom and a third pair connecting a serial signal line of said intercom with said control port for integrating the control and operation of said sound distribution system with said intercom;
   said intercom speaker signal is propagated to said selector/encoder, said microphone signal is propagated to said intercom and said serial signals are exchanged between said at least one of said selector/encoder and said sound distributor with said intercom by a selected commands fed to at least one of said selector/encoder, said sound distributor, said decoding unit and said intercom, including commands to switch over to intercom mode, encode a monaural sound of said intercom speaker signal, enable said microphone and open voice communication with said intercom, wherein said commands are generated via said touch keys of one of said selector/encoder and keys of said intercom or said remote control unit.

15. The apparatus for combining sound distribution system according to claim 11, wherein at least one of said A and B speakers includes at least one remote control receiver and at least one remote control transmitter for exchanging said serial signals including remote control signals via said interconnection cable with at least one of said selector/encoder and said sound distributor;
   each said selector/encoder and said sound distributor includes said control port for connection to a serial port of an home automation distributor for exchanging said serial signals including said remote control signals through said serial port of said home automation distributor for integrating said sound distribution system with said home automation system;

the integrated systems are operated by exchanging said serial signals between said home automation distributor, said sound distributor and said selector/encoder through a medium selected from a group comprising said selector/encoder, said sound distributor, said remote control unit, said A speaker, said B speaker, said control port, said serial port, a remote control driver included in said home automation system and combinations thereof.

16. The apparatus for combining sound distribution system according to claim 14, wherein said control port of said sound distributor, said serial port of said home automation distributor and said serial line of said intercom are connected for exchanging the controls and operation of the three systems for integrating said sound distribution, said intercom and said home automation through a medium selected from a group comprising said selector/encoder, said remote control unit, said A speaker, said B speaker, said control port, said serial signal, said serial port, said intercom, said remote control driver and combinations thereof.

17. The apparatus for combining sound distribution system according to claim 14, wherein said intercom includes a combination port for propagating a combined multiplexed signals selected from a group comprising video, audio, data, command, control, alarm and combinations thereof generated by said intercom system, including said serial signals, said intercom speaker signal and said microphone signal exchanged through said sound distributor;

at least one of said home automation distributor and said sound distributor include a reciprocal port and an interface connector for propagating said combination of multiplexed signals to an interface unit selected from a group comprising a signal converter, a modem, ADSL, a PC, a PC server, a PC program, a USB converter, a network communicator, a router, a network switch and combinations thereof;

said interface unit connects to a network selected from a group comprising a local area network, a wide area network, a public network, a dedicated network, the Internet and combinations thereof for propagating an interfaced signal adapted for communicating via said network for remotely operating said home automation including said sound distribution and for communicating with said intercom and with an e-station selected from a group comprising e-emergency, e-medical, e-hospital, e-service, e-shopping and combinations thereof.

18. The apparatus for combining sound distribution system according to claim 17, wherein said remote control receiver and said remote control transmitter are selected from a group comprising IR, RF, wired and combinations thereof for exchanging data and signals generated by at least one emergency and medical devices associated with said intercom, said devices selected from a group comprising monitors, sensors, cameras, diagnosis, analysis, treatment, applicators, life support, rehabilitation and combinations thereof, for communicating with said e-station said data and signals outputted by said devices and for selectively operating said devices remotely.

19. The apparatus for combining sound distribution system according to claim 17, wherein at least one of said distributor and said interface unit includes an extracting circuit for extracting said video signal from said combined multiplexed signal for displaying an image onto a screen selected from a group comprising a television set, a video monitor, a tablet monitor, a PC display monitor, a set-top box, a cable box, an antenna box, a satellite box, a digital to analog converter box, an analog to digital converter box, a tuner box, a PC, a tablet controller, a video selector and combinations thereof; and at least one of said home automation distributor, said sound distributor, said selector/encoder and said interface unit is connected via video feed cable to said screen for displaying said image by a command to a medium selected from a group comprising said selector/encoder, said remote control unit, said A speaker, said B speaker, said serial port, said control port, said remote control driver, said intercom and combinations thereof.

20. An apparatus for combining sound distribution system according to claim 11, wherein said selector/encoder, said sound distributor and said A speaker propagate said encoded stereo signal via a first twisted pair, said DC power link via a second twisted pair and said serial signals are exchanged via a third twisted pair of a cascading fitted multi twisted pair cables, and wherein said selector/encoder, said sound distributor, said A speaker and said B speaker include matching connectors for said fitted multi twisted pair cables, and wherein said B speaker also connects to said A speaker via a cascaded segment of said fitted multi twisted pair cable.

* * * * *